United States Patent
Obata et al.

(10) Patent No.: US 10,753,843 B2
(45) Date of Patent: Aug. 25, 2020

(54) METHOD AND APPARATUS FOR MEASURING GEL PARTICLE

(71) Applicant: PROJECT KBF CO., LTD., Tokyo (JP)

(72) Inventors: Toru Obata, Tokyo (JP); Juichiro Ukon, Ibaraki (JP)

(73) Assignee: PROJECT KBF CO., LTD., Tokyo (JP)

( * ) Notice: Subject to any disclaimer, the term of this patent is extended or adjusted under 35 U.S.C. 154(b) by 91 days.

(21) Appl. No.: 16/066,479

(22) PCT Filed: Dec. 26, 2016

(86) PCT No.: PCT/JP2016/088741
§ 371 (c)(1),
(2) Date: Jun. 27, 2018

(87) PCT Pub. No.: WO2017/115754
PCT Pub. Date: Jul. 6, 2017

(65) Prior Publication Data
US 2019/0017915 A1  Jan. 17, 2019

(30) Foreign Application Priority Data

Dec. 28, 2015 (JP) .................................. 2015-256564

(51) Int. Cl.
*G01N 15/06* (2006.01)
*G01N 21/82* (2006.01)
(Continued)

(52) U.S. Cl.
CPC ............. *G01N 15/06* (2013.01); *G01N 21/51* (2013.01); *G01N 21/82* (2013.01);
(Continued)

(58) Field of Classification Search
CPC ........ G01N 15/06; G01N 21/51; G01N 21/82; G01N 2015/0053; G01N 2015/0693; G01N 2021/0325; G01N 2021/4709
See application file for complete search history.

(56) References Cited

U.S. PATENT DOCUMENTS

2004/0100630 A1* 5/2004 Yamaguchi ........ G01N 15/0211
356/336
2008/0259313 A1   10/2008 Berndt
(Continued)

FOREIGN PATENT DOCUMENTS

JP   2004-93536 A    3/2004
JP   2004-170320 A   6/2004
(Continued)

OTHER PUBLICATIONS

International Search Report, issued in PCT/JP2016/088741, dated Mar. 14, 2017.
(Continued)

*Primary Examiner* — Jamil Ahmed
(74) *Attorney, Agent, or Firm* — Birch, Stewart, Kolasch & Birch, LLP

(57) ABSTRACT

Provided is a gel particle measuring apparatus for detecting scattered light generated by light irradiation at a production start time point of a gel particle, and performing measurement promptly and accurately while suppressing attenuation of the scattered light in a solvent in which the phenomenon occurs. The gel particle measuring apparatus includes: a sample cell (1) configured to accommodate a sample (S) and a solution containing a reagent (R); a stirrer (2) configured to continuously stir a mixed solution (W) in the sample cell (1); a light source (3) configured to irradiate the mixed solution (W) in the sample cell (1) with coherent irradiation light (Bm); a backscattered light detector (4) configured to detect, out of light scattered in the mixed solution (W) in the
(Continued)

sample cell (1), a backscattered light component returning toward the light source (3); a light path adjuster (5) configured to adjust an incident portion surface of the sample cell (1) so that a detection light path (ST) of, out of the light scattered in the mixed solution (W) in the sample cell (1), light traveling toward the backscattered light detector (4) is different from a reflection light path (DT) of reflection light ($Bm_0$) reflected from a surface of the sample cell (1); and a measurement device (6) configured to determine at least a production start time point of the gel particle (G) in the mixed solution (W) based on a detection output of the backscattered light detector (4).

12 Claims, 20 Drawing Sheets

(51) Int. Cl.
  *G01N 21/51* (2006.01)
  *G01N 21/03* (2006.01)
  *G01N 15/00* (2006.01)
  *G01N 21/47* (2006.01)

(52) U.S. Cl.
  CPC ............... *G01N 2015/0053* (2013.01); *G01N 2015/0693* (2013.01); *G01N 2021/0325* (2013.01); *G01N 2021/4709* (2013.01)

(56) References Cited

U.S. PATENT DOCUMENTS

| | | |
|---|---|---|
| 2010/0178206 A1 | 7/2010 | Obata et al. |
| 2011/0013185 A1 | 1/2011 | Obata |
| 2013/0078150 A1* | 3/2013 | Obata .................... G01N 15/06 422/82.05 |
| 2013/0183763 A1 | 7/2013 | Obata et al. |

FOREIGN PATENT DOCUMENTS

| | | |
|---|---|---|
| JP | 2008-510169 A | 4/2008 |
| JP | 2011-257156 A | 12/2011 |
| JP | 223131450 A | 7/2015 |
| WO | WO 2008/038329 A1 | 4/2008 |
| WO | WO 2009/116633 A1 | 9/2009 |

OTHER PUBLICATIONS

Japanese Office Action, issued in Application No. 2017-507599, dated Sep. 5, 2017 and Mar. 6, 2018.
Written Opinion of the International Searching Authority, issued in PCT/JP2016/088741, dated Mar. 14, 2017.

* cited by examiner

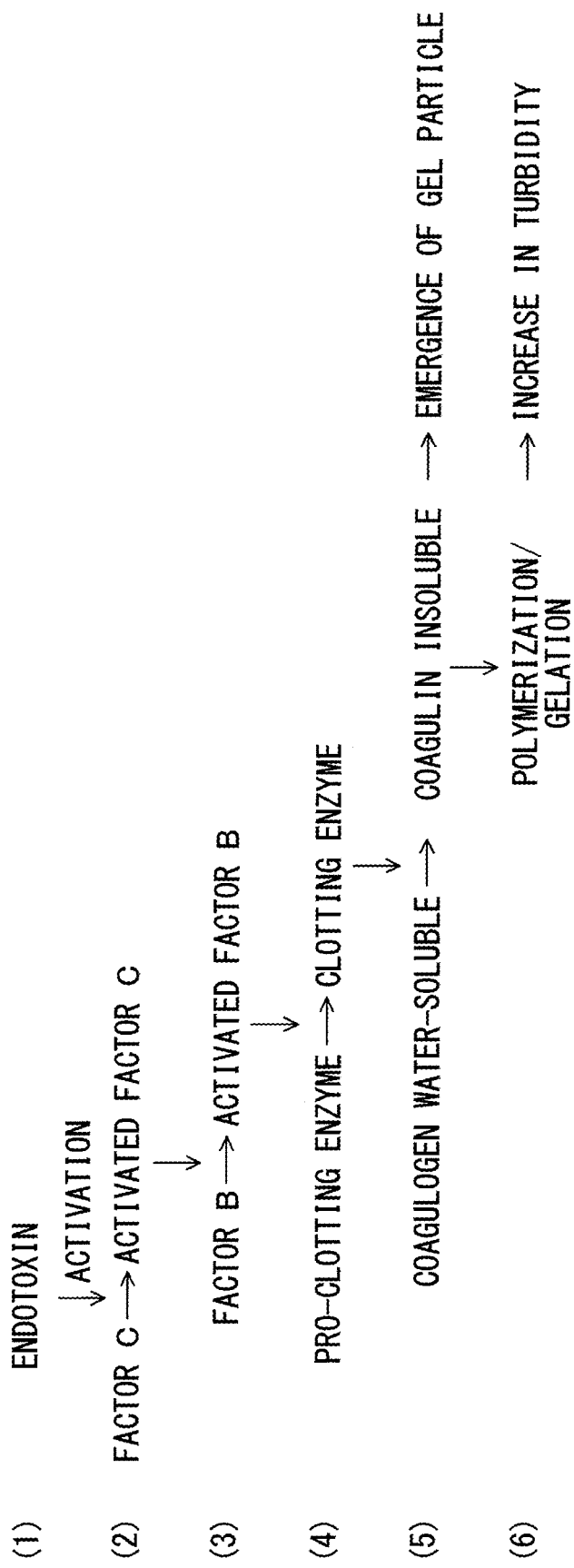

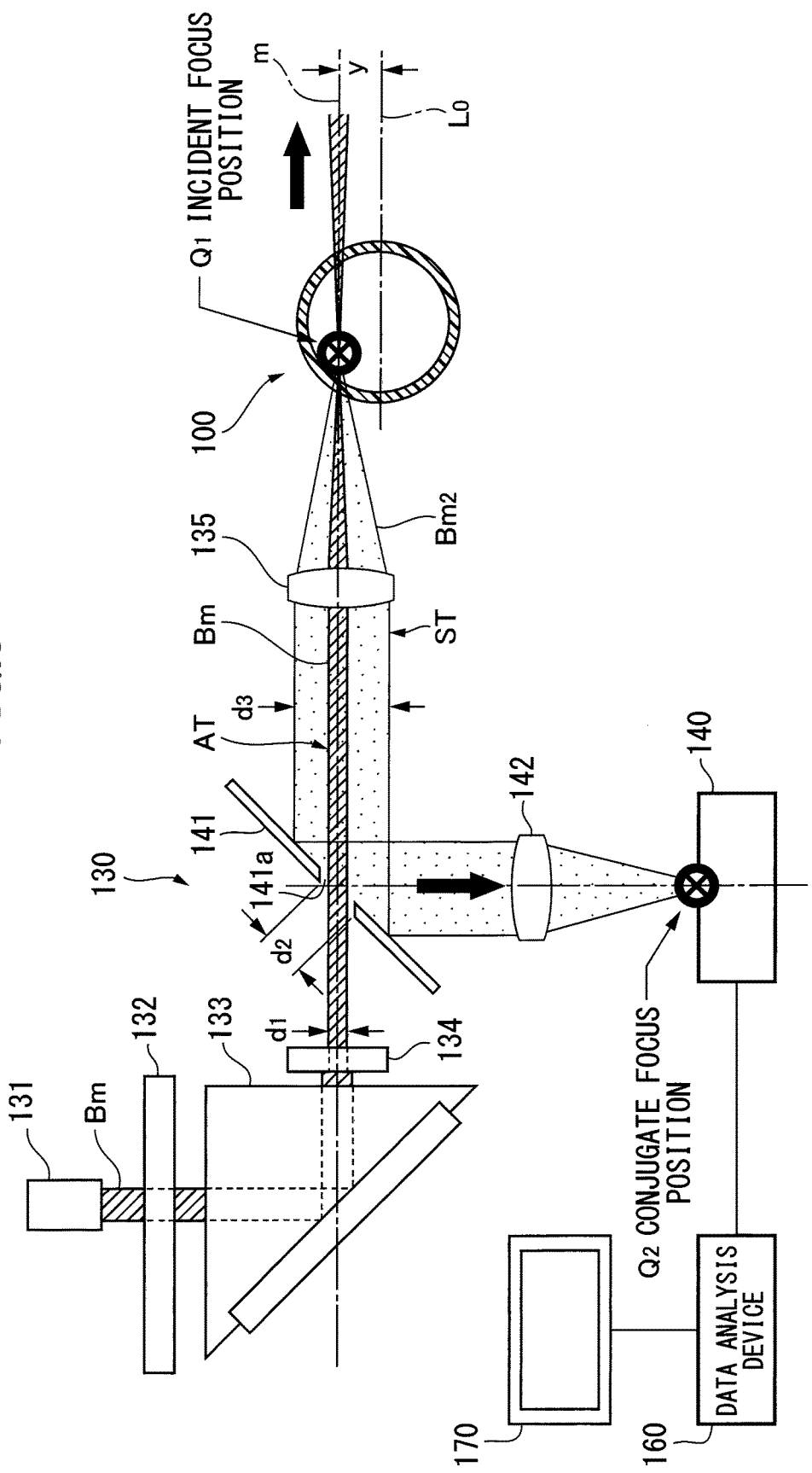

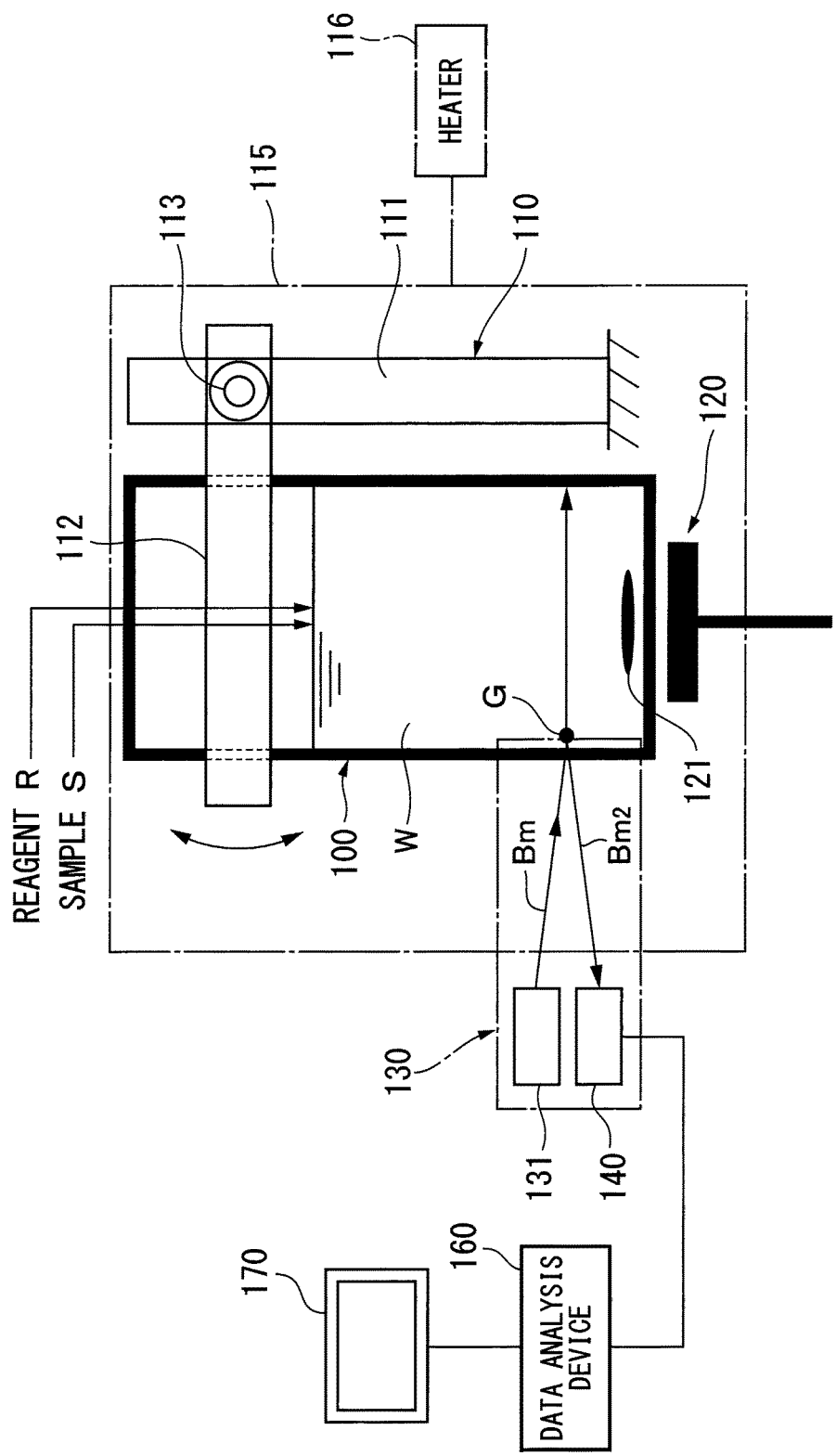

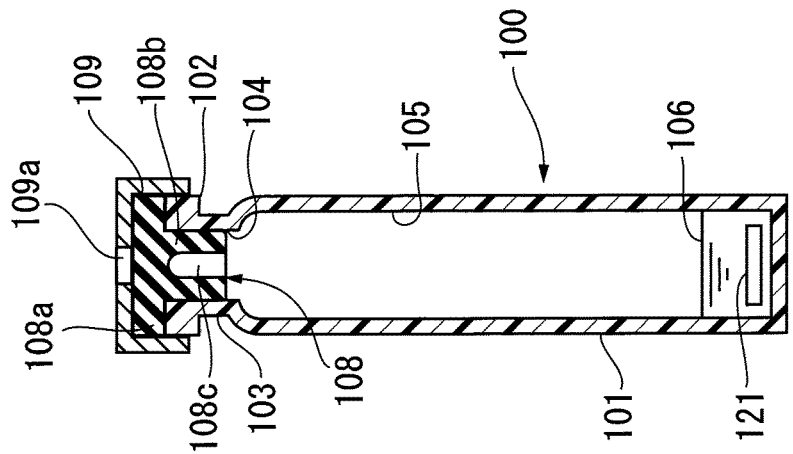
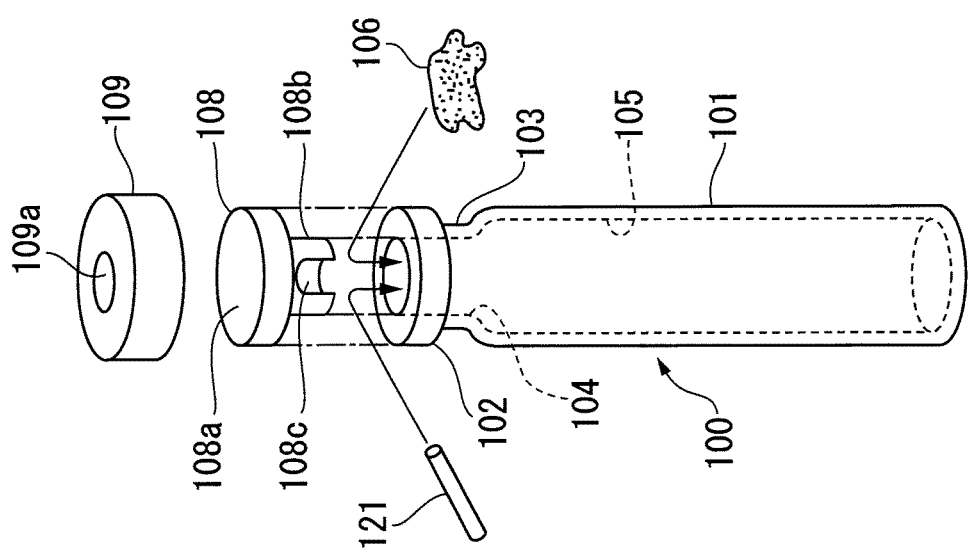
FIG.7A
FIG.7B

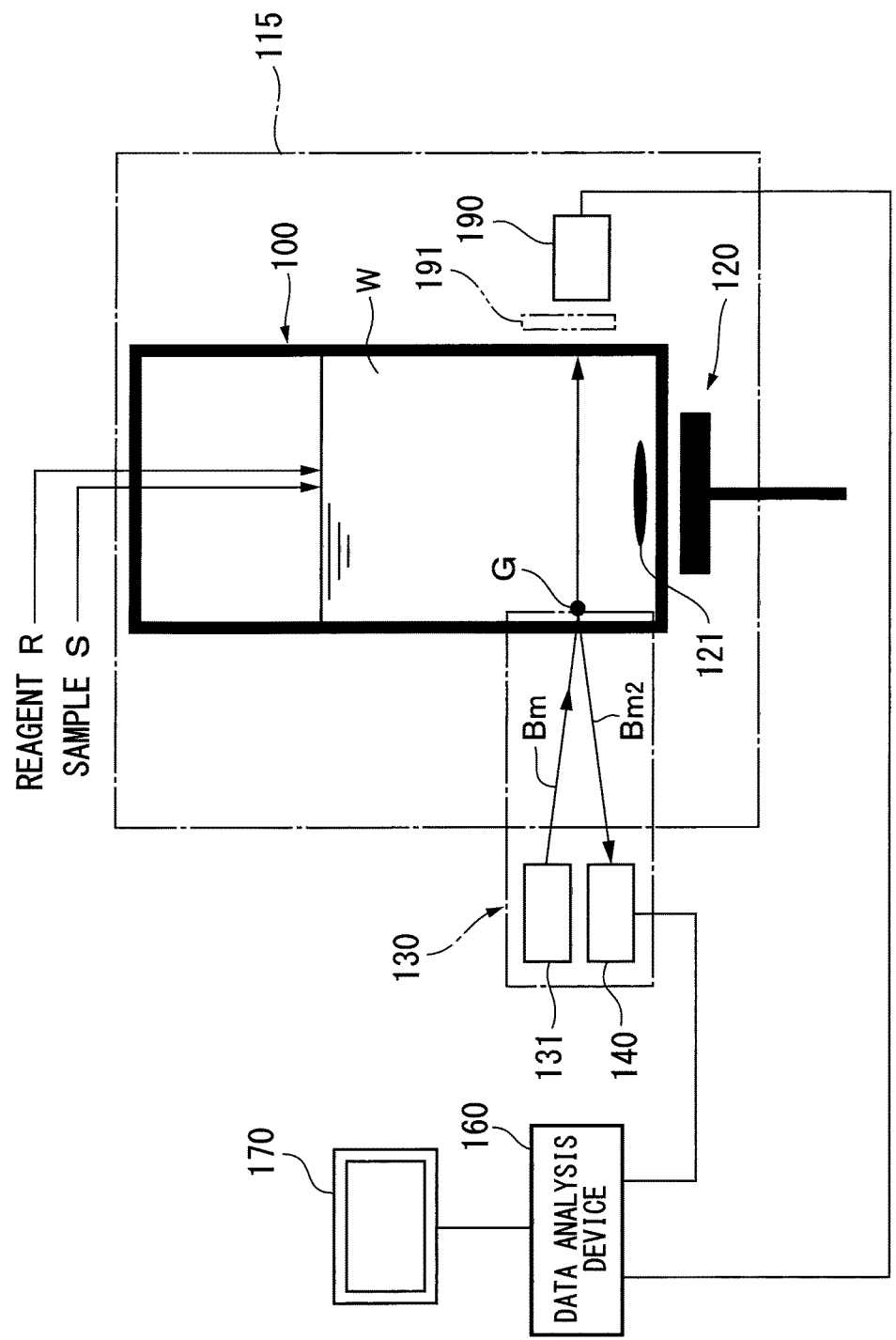

FIG.17

METHOD AND APPARATUS FOR MEASURING GEL PARTICLE

BACKGROUND OF THE INVENTION

1. Field of the Invention

The present invention relates to a method and apparatus for measuring a gel particle, which is produced from a target substance to be measured, such as an endotoxin or a 3-D-glucan, in a sample, through a gelation reaction using a reagent for aggregating the target substance, and more particularly, to a method and apparatus for measuring a gel particle configured to measure a time point at which a gel particle starts emerging with high sensitivity.

2. Description of the Related Art

So-called endotoxins (intracellular toxins) mainly include a part of membrane components of cells of bacteria that are not stained by Gram staining (Gram-negative), and a component thereof is a lipid-polysaccharide called a lipopolysaccharide. Specifically, the component is a lipopolysaccharide (LPS) in which a lipid called Lipid A and a polysaccharide chain are bonded via 2-keto-3-deoxyoctonate (KDO). When a lipid structure portion called Lipid A contained in the lipopolysaccharide enters a human body due to infection, the lipid structure portion binds to a cellular receptor to cause inflammation, thereby causing a variety of severe clinical symptoms in many cases. As described above, the endotoxins are substances causing clinical symptoms that have extremely high fatality rates, such as sepsis and bacteremia, in humans. Thus, estimation of the endotoxins having entered the body is highly demanded clinically.

Further, it is important that medicinal products (such as injections), medical devices (such as angiocatheters), and a dialysis solution to be used for hemodialysis treatment be free of endotoxin contamination (pyrogen-free) and it is strictly required that endotoxins be properly removed or controlled in medicinal products (such as recombinant proteins and DNA used for gene therapies), food additives, cosmetics, and the like prepared through use of bacteria.

In confirmation of the removal of endotoxins or measurement of endotoxins in emergency medicine, promptness is required for attaining the purposes of coping with a large number of measuring samples and carrying out life-saving treatment.

Research has long been made on measurement of the value of endotoxins for treatment of sepsis or the like. After the discovery of a phenomenon in which a factor group contained in a *limulus* amebocyte component specifically reacts with endotoxins to become aggregates to close a wound site, attempts to quantify the endotoxins have been made through use of *limulus* amebocyte lysates (LAL reagent or *limulus* reagent).

A measuring method in which the *limulus* reagent was used for the first time was a semi-quantitative measuring method called a gelation method, involving simply mixing plasma from a patient serving as a sample with the *limulus* reagent, leaving the mixed solution to stand still, positioning the mixed solution upside down after a certain time period, confirming the presence or absence of gelation of the mixed solution based on solidification of the mixed solution, and estimating the amount of endotoxins at the maximum dilution ratio for causing the gelation.

After that, attention has been paid to, the increase, in turbidity of the reaction solution in a gelation reaction process. As a result, there is known a turbidimetric time assay involving performing quantitative measurement of an endotoxin concentration based on changes in turbidity in association with the gelation reaction of the mixed solution left to stand still by an optical measuring method.

In addition, there has already been known a synthetic chromogenic substrate method in which a gelation reaction causing conversion from coagulogen to coagulin is replaced by a chromogenic reaction of a synthetic substrate in the final stage of a reaction process using a *limulus* reagent and a chromogenic pigment is bonded to the substrate. This is a method, for example, involving adding a synthetic chromogenic substrate (Boc-Leu-Gly-Arg-p-nitroanilide) in place of a coagulation precursor (coagulogen) in a coagulation process, to thereby release free p-nitroaniline through hydrolysis of the synthetic chromogenic substrate, and measuring an endotoxin concentration through colorimetric analysis of the resultant yellow chromogenic development. There has also been known a procedure using a fluorescent pigment instead of p-nitroaniline.

Here, as a related-art gelation reaction measuring apparatus, there are given, for example, those disclosed in Patent Literature 1 to Patent Literature 3.

Patent Literature 1 relates to a gelation reaction measuring apparatus using a turbidimetric time assay. This is an assay involving measuring time-dependent changes in intensity of transmitted light in a mixed solution obtained by mixing a specimen (sample) and a *limulus* reagent and measuring an endotoxin concentration in the specimen based on the amounts of the changes in a predetermined time period.

In addition, Patent Literature 2 relates to a gelation measuring apparatus for measuring a concentration of a substance, for example, an endotoxin to be measured through a gelation reaction, and the gelation measuring apparatus includes a light receiving element configured to receive scattered light formed by a laser light beam of each gel particle produced in a sample cell, and a measurement device configured to measure each diameter and the number of the gel particles in time series based on a scattered light detection output of the light receiving element.

Further, Patent Literature 3 relates to a gel particle measuring apparatus including: a sample cell configured to accommodate a sample and a solution containing a reagent; a stirrer configured to stir a mixed solution; a coherent light source configured to irradiate the mixed solution with coherent light; a transmitted light detector configured to detect light having been transmitted through the mixed solution in the sample cell; a transmitted light fluctuation measurement device configured to measure a fluctuation component of the transmitted light based on a detection output of the transmitted light detector; and a gel particle production determination device configured to determine at least a production state of a gel particle in the mixed solution leading to timing at which the mixed solution changes in phase from a sol phase to a gel phase, based on measurement results of the transmitted light fluctuation measurement device.

Any of Patent Literature 1 to Patent Literature 3 includes detecting, out of light scattered in a sample cell in irradiation light from a laser light source, forward scattered light transmitted forward on a side different from a side on which the laser light source is set, for example, on a side opposite, to the laser light source, or side scattered light scattered sideward with respect to the laser light source, and measuring, based on the detection results, an endotoxin concentration to be measured.

Further, measuring technologies using a gelation reaction are used for measuring not only the endotoxins described above but also β-D-glucans or the like.

β-D-Glucans are polysaccharides constituting cell membranes specific to fungi. Measurement of the β-D-glucans is effective for screening a wide variety of fungi responsible for fungal infection, including not only fungi frequently found in a general clinical environment, such as *Candida*, *Aspergillus*, or *Cryptococcus*, but also fungi rarely found in the general clinical environment.

The phenomenon in which a component extracted from a *limulus* hemocyte is gelated with β-D-glucans is also used in the measurement of β-D-glucans, and the above-mentioned gelation method, turbidimetric time assay, or synthetic chromogenic substrate method is used to carry out the measurement.

Measuring procedures of endotoxins and of β-D-glucans have common points. For example, substantially the same kind of measuring hardware is used to remove a Factor G component, which the β-D-glucans specifically react with, from the components extracted from a *limulus* hemocyte, and with this, a gelation reaction or chromogenic reaction selective to endotoxins can be measured. Alternatively, endotoxins in a sample are inactivated by pretreatment, and with this, a gelation reaction or chromogenic reaction selective to β-D-glucans can be measured.

Patent Literature 1: Japanese Patent Application Laid-open No. 2004-93536 (Embodiments of the Invention and FIG. 3)

Patent Literature 2: WO 2008/038329 A1 (Best Modes for carrying out the Invention and FIG. 1)

Patent Literature 3: WO 2009/116633 A1 (Best Modes for carrying out the Invention and FIG. 1)

Patent Literature 4: Japanese Patent Application Laid-open No. 2011-257156 (Best Modes for carrying out the Invention and FIG. 1)

However, the related-art gelation method, turbidimetric time assay, and synthetic chromogenic substrate method have the following drawbacks.

Both the gelation method and the turbidimetric time assay require a long time period of about 90 minutes or longer under low concentrations for the production of gels. That is, although the gelation time of a reaction solution is proportional to the concentration of a target substance in, a sample to, be measured, it is not possible to detect the accurate gelation start time or the like by any of the gelation method and the turbidimetric time assay from the viewpoint of sensitivity, and hence a reaction amount is calculated based on the time period until the gelation proceeds to some degree and used as an indication for the gelation time.

The turbidimetric time assay is taken as an example. According to the turbidimetric time assay, through preparation of a reagent, it is possible to identify the turbidity at an initial concentration level at which a change starts and the turbidity at a concentration level at which the change arrives, but it is difficult to identify the time at which each change starts and the time at which the each change finishes. Thus, the turbidimetric time assay has been established as a quantification method in which measurement of a change at a certain level (detection of an increase in turbidity, in general, the progress of 8% turbidity of a largest reaction amount) between the initial level and the final level is carried out instead of the observation of a change in gelation as a whole. However, when the concentration of endotoxins is low, the gelation of the system as a whole is delayed, and at the same time, a change in turbidity to be observed is also delayed, resulting in difficulty in measuring the change in turbidity. As a result, sensitivity inevitably lowers.

Thus, it is hard to say that both the gelation method and the turbidimetric time assay are suitable for the case where emergency is required and for the measurement of a number of specimens. Further, when the turbidimetric time assay is carried out, unspecific turbidity irrelevant to endotoxins occurs in some cases, and hence the turbidimetric time assay may lack measuring accuracy. Moreover, the critical concentration for measurement in the gelation method is 3 pg/ml, and the critical concentration for measurement in the turbidimetric time assay is about 1 pg/ml.

Meanwhile, the measuring time of the synthetic chromogenic substrate method is as short as about 30 minutes as compared to those of the gelation method and the turbidimetric time assay. However, in measurement of natural products, such as clinical samples, a false-positive reaction is caused in some cases due to mixed non-specific protease, and hence it is difficult to perform measurement with high specificity through use of the synthetic chromogenic substrate method. Further, in the synthetic chromogenic substrate method, preparation for measurement is troublesome, and the critical concentration for measurement is 3 pg/ml, which is inferior to that of the turbidimetric time assay.

Further, for example, the gelation reaction, measuring apparatus described in Patent Literature 1 adopts a method involving observing a process in which a reagent reacts with an endotoxin to be coagulated, and based on a measuring principle created, from the fact that the coagulation speed is dependent on an endotoxin concentration, it is a necessary and sufficient condition that gelation be performed under a state in which a reaction solution is left to stand still.

However, in the reaction in which a reagent derived from a *limulus* amebocyte lysate, which is an enzyme mixed solution of a soluble protein, reacts with an endotoxin to produce an insoluble protein coagulin, thereby being gelated, homogeneity of the solution decreases along with the progress of the reaction, and hence it is unlikely that a certain condition is maintained as a biochemical enzyme reaction system. Thus, the above-mentioned reaction is assumed to be responsible for poor sensitivity, a long measuring time, an unstable measurement value, and the like of the turbidimetric time assay.

Therefore, for example, as disclosed in Patent Literature 3, there has been adopted a procedure for continuously stirring the reaction solution so as to homogenize the reaction solution. As a result, the reaction has become homogeneous and prompt. Meanwhile, it has been found that gelation of the reaction solution as a whole is inhibited, and instead, when coagulin produced in the reaction solution reaches a certain concentration, the coagulin is aggregated as a minute gel particle. Fortunately, it has been found that the time period until the minute gel particle is produced is also dependent on an endotoxin concentration, and there has already been provided a procedure (Endotoxin Scattering Photometry (ESP) method (trademark)) for quantifying an endotoxin by measuring a time period until the scattered light of the gel particle is detected after the gel particle is irradiated with coherent light, for example, laser light.

Here, the fundamental difference between the turbidimetric time assay disclosed in Patent Literature 1 and the ESP method is, for example, as follows. In the turbidimetric time assay disclosed in Patent Literature 1, the progress of gelation under settled condition is measured. Meanwhile, in the ESP method, a time period until gelation under continuous stirring condition starts is measured. That is, it can also be said that a measurement finish point of the ESP method corresponds to a measurement start point of the turbidimetric time assay.

In addition, scattered light with respect to the particles is generated in all directions, and hence any scattered light may be captured in the ESP method. When scattering of light is roughly classified into forward scattering, side scattering, and backscattering (scattering in directions of 0°, 90°, and 180° with respect to a light incident direction to the sample cell), in the case where the size of particles and the direction of generation of scattered light are considered, weak light is radiated in all directions with minute particles, whereas forward scattering tends to become strong as particles increase in size. Therefore, although strong forward scattering may be advantageous in terms of detection, it is desired that weak scattered light generated in all directions with minute particles be detected from the viewpoint of promptly identifying a particle production initial stage.

In this case, the forward scattering and the side scattering are disadvantageous for capturing a weak, signal at a minute particle production initial stage, for example, attenuation of a signal caused by scattered light absorption with a reaction solution and generation of secondary scattered light (multiple scattering) with respect to other particles in the reaction solution. In this respect, the backscattering, which can be captured immediately under light incidence of a reaction container and is less liable to be attenuated and absorbed by the reaction solution, is advantageous.

Based on the foregoing viewpoint, as a system of promptly capturing a production initial stage of a gel particle, a system of detecting backscattered light has already been disclosed in Patent Literature 4.

The system disclosed in Patent Literature 4 includes: a sample cell configured to accommodate a sample and a solution containing a reagent; a stirrer configured to stir a mixed solution; an incident light source configured to irradiate the mixed solution with coherent light; a backscattered light detector, which is arranged outside the sample cell and on the same side as the incident light source and is configured to detect, out of light scattered in the mixed solution in the sample cell, a backscattered light component returning toward the incident light source; a scattered light fluctuation measurement device configured to measure a fluctuation component of backscattered light based on a detection output of the backscattered light detector; and a gel particle production determination device configured to determine a production state of the gel particle including at least a production start time point of the gel particle leading to timing at which the mixed solution changes in phase from a sol phase to a gel phase, based on measurement results of the scattered light fluctuation measurement device.

It is only required that the backscattered light detector as used herein detect, of the light scattered in the mixed solution in the sample cell, the backscattered light component returning toward the incident light source. In a mode in which the backscattered light detector is arranged in the vicinity of the sample cell, there is a typical system of detecting, of the light scattered in the mixed solution in the sample cell, the scattered light component on the periphery of a true backscattering direction by forming a detection surface on the periphery of a region in which light from the incident light source is radiated to the sample cell. In this detecting system, when light is radiated along a normal of a surface of the sample cell, even if a part of irradiation light is reflected from the surface of the sample cell, the reflection light travels in the true backscattering direction, and hence the situation in which the reflection light component from the surface of the sample cell is let in the backscattered light detector is avoided.

After that, the inventors of the present invention have made further investigations on the system of detecting backscattered light and have reached the following conclusion. It is desired that, out of the light scattered in the mixed solution in the sample cell, the scattered light component traveling in the true backscattering direction can be accurately detected, because attenuation of the scattered light in the mixed solution can be minimized, and the production start time point of the gel particle can be detected more promptly with high sensitivity.

However, in order to detect the scattered light component traveling in the true backscattering direction, it is essential to detect the above-mentioned scattered light component under a state in which the reflection light component from the surface of the sample cell is separated, and investigations have been made successively regarding how to achieve the foregoing.

SUMMARY OF THE INVENTION

A technical object of the present invention is to, in measurement of a target substance in a sample through a gelation reaction under continuous stirring condition, detect scattered light generated by light irradiation at a production start time point of a gel particle, and measure the production start time point of the gel particle promptly and accurately while suppressing attenuation of the scattered light in a solvent in which the phenomenon occurs.

According to a first technical feature of the present invention, there is provided a gel particle measuring method for measuring a gel particle produced from a target substance in a sample through a gelation reaction under continuous stirring condition, the method using: a sample cell, which has, in at least part thereof, an incident portion through which light enters, and is configured to accommodate the sample containing the target substance to be measured and a solution containing a reagent for causing gelation of the target substance; a stirrer configured to continuously stir a mixed solution including the sample and the reagent in the sample cell so as to inhibit gelation of the mixed solution as a whole; a light source, which is arranged outside the incident portion of the sample cell, and is configured to irradiate the mixed solution in the sample cell with coherent light; and a backscattered light detector, which is arranged outside the incident portion of the sample cell and on the same side as the light source, and is configured to detect, out of light scattered in the mixed solution in the sample cell, a backscattered light component returning toward the light source, the method including: a stirring step of continuously stirring the mixed solution with the stirrer under a state in which the mixed solution is accommodated in the sample cell; a light separating step of, during the stirring step, causing irradiation light from the light source to enter the mixed solution, making a reflection light path of, light reflected from a surface of the sample cell different from a detection light path of light traveling toward the backscattered light detector, and capturing the light component scattered in the mixed solution with the backscattered light detector; and a measuring step of measuring a fluctuation component of the scattered light based on a detection output of the backscattered light detector obtained through the light separating step, and determining a production state of the gel particle including at least a production start time point of the gel particle in the mixed solution leading to a time point at which the mixed solution changes in phase from a sol phase to a gel phase.

According to a second technical feature of the present invention, in the gel particle measuring method having the first technical feature, in the light separating step, the detection light path includes a part of an irradiation light path of the light radiated from the light source toward the sample cell.

According to a third technical feature of the present invention, there is provided a gel particle measuring apparatus for measuring a gel particle produced from a target substance in a sample through a gelation reaction under continuous stirring condition, including: a sample cell, which has, in at least part thereof, an incident portion through which light enters, and is configured to accommodate the sample containing the target substance to be measured and a solution containing a reagent for causing gelation of the target substance; a stirrer configured to continuously stir a mixed solution including the sample and the reagent in the sample cell so as to inhibit gelation of the mixed solution as a whole; a light source, which is arranged outside the incident portion of the sample cell, and is configured to irradiate the mixed solution in the sample cell with coherent light during the stirring of the mixed solution with the stirrer continuously; a backscattered light detector, which is arranged outside the incident portion of the sample cell and on the same side as the light source, and is configured to detect, out of light scattered in the mixed solution in the sample cell, a backscattered light component returning toward the light source; a light path adjuster configured to, when irradiation light from the light source enters the incident portion of the sample cell, adjust an incident portion surface of the sample cell so that a detection light path of, out of the light scattered in the mixed solution in the sample cell, light traveling toward the backscattered light detector is different from a reflection light path of light reflected from a surface of the sample cell; and a measurement device configured to measure a fluctuation component of the scattered light based on a detection output of the backscattered light detector, and determine a production state of the gel particle including at least a production start time point of the gel particle in the mixed solution leading to a time point at which the mixed solution changes in phase from a sol phase to a gel phase.

According to a fourth technical feature of the present invention, in the gel particle measuring apparatus having the third technical feature, the sample cell includes a bottomed tubular container having a circular shape in cross, section with at least the incident portion being penetrable, and the light path adjuster is configured to arrange an optical axis of the light source so that the optical axis passes through a position being offset from a center axis of the bottomed tubular container.

According to a fifth technical feature of the present invention, in the gel particle, measuring apparatus having the third technical feature, the light path adjuster is configured to arrange a center axis of the sample cell and an optical axis of the light source so that the center axis and the optical axis are inclined from an orthogonal position between the center axis and the optical axis.

According to a sixth technical feature of the present invention, in the gel particle measuring apparatus having the third technical feature, the light path adjuster includes a reflection surface that is formed in advance in the incident portion of the sample cell so that reflection light reflected from the incident portion surface, out of the irradiation light from the light source, travels toward a direction different from a direction toward the backscattered light detector.

According to a seventh technical feature of the present invention, in the gel particle measuring apparatus having the third technical feature, an optical system of the gel particle measuring apparatus including the light source, the backscattered light detector, and the light path adjuster further includes a light path branching member configured to transmit the light radiated from the light source toward the incident portion of the sample cell, and branch the detection light path of, out of the light scattered in the mixed solution, the light traveling toward the backscattered light detector, from a middle of an irradiation light path from the light source.

According to a eighth technical feature of the present invention, in the gel particle measuring apparatus having the third technical feature, an optical system of the gel particle measuring apparatus including the light source, the backscattered light detector, and the light path adjuster further includes: an imaging member for incidence configured to cause the irradiation light from the light source to be converged with a proximity position after the irradiation light has passed through an inner wall of the sample cell being a focus position; and an imaging member for detection configured to cause the light traveling toward the backscattered light detector to be converged with a detection surface of the backscattered light detector being a conjugate focus position.

According to a ninth technical feature of the present invention, in the gel particle measuring apparatus having the third technical feature, an optical system of the gel particle measuring apparatus including the light source, the backscattered light detector, and the light path adjuster further includes: an imaging member for incidence configured to cause the irradiation light from the light source to be converged, with a proximity position after the irradiation light has passed through an inner wall of the sample cell being a focus position; a first imaging member for detection configured to cause the light traveling toward the backscattered light detector to be converged with a position of a diaphragm member being a conjugate focus position, the diaphragm member being arranged in a middle of the detection light, path toward the backscattered light detector; and a second imaging member for detection configured to cause the light having passed through the diaphragm member to be converged with a detection surface of the backscattered light, detector being a conjugate focus position.

According to a tenth technical feature of the present, invention, in the gel particle measuring apparatus having the third technical feature, an optical system of the gel particle measuring apparatus including the light source, the backscattered light detector, and the light path adjuster is configured to narrow down a light beam traveling from the light source toward the sample cell through a diaphragm member, and set the light beam to be narrower than, out of the light scattered in the mixed solution, a light beam traveling toward the backscattered light detector.

According to a eleventh technical feature of the present invention, in the gel particle measuring apparatus having the third technical feature, the sample cell is arranged in a thermostatic chamber.

According to a twelfth technical feature of the present invention, in the gel particle measuring apparatus having the third technical feature, the sample cell includes, in the sample cell or around the sample cell, a stray light remover configured to remove a stray light component generated by one of transmission and scattering on an inner wall of the sample cell other than, out of the irradiation light from the light source, a backscattered light component traveling toward the backscattered light detector in the mixed solution.

According to a thirteenth technical feature of the present invention, in the gel particle measuring apparatus having the third technical feature, further including a display configured to display measurement results of the measurement device.

According to a fourteenth technical feature of the present invention, in the gel particle measuring apparatus having the third technical feature, further including: a first scattered light detector including the backscattered light detector configured to detect, out of the light scattered in the mixed solution, the backscattered light component returning toward the light source; and a second scattered light detector configured to detect, out of the light scattered in the mixed solution, a scattered light component other than the backscattered light component returning toward the light source, the measurement device is configured to determine the production state of the gel particle including the production start time point of the gel particle in the mixed solution based on measurement results of the fluctuation component of the detection output of the first scattered light detector, and the measurement device is configured to determine a production state of the gel particle, other than the production state of the gel particle including the production start, time point of the gel particle in the mixed solution, based on measurement results of a fluctuation component of one of detection outputs of the first scattered light detector and the second scattered light detector and a detection output of the second scattered light detector.

According to a fifteenth technical feature of the present invention, in the gel particle measuring apparatus having the third technical feature, the target substance to be measured comprises an endotoxin, and the reagent for gelation with the endotoxin comprises a reagent derived from one of an amebocyte of an American horse-shoe crab, *Limulus* and a hemocyte of an organism equivalent to the horse-shoe crab.

According to the first technical feature of the present invention, in the measurement of the target substance in the sample through the gelation reaction under continuous stirring condition, the scattered light generated by light irradiation can be detected at the production start time point of the gel particle, and the production start time point of the gel particle can be measured promptly and accurately while suppressing attenuation of the scattered light in the solvent in which the phenomenon occurs.

According to the second technical feature of the present invention, in the measurement of the target substance in the sample through the gelation reaction under continuous stirring condition, the scattered light traveling in the true backscattering direction generated by light irradiation can be detected at the production start time point of the gel particle, and the production start time point of the gel particle can be measured promptly and accurately while suppressing attenuation of the scattered light in the solvent in which the phenomenon occurs.

According to the third technical feature of the present invention, in the measurement of the target substance in the sample through the gelation reaction under continuous stirring condition, it is possible to easily implement the gel particle measuring method capable of detecting the scattered light generated by light irradiation at the production start time point of the gel particle and measuring the production start time point of the gel particle promptly and accurately while suppressing attenuation of the scattered light in the solvent in which the phenomenon occurs.

According to the fourth technical feature of the present invention, the bottomed tubular container having a circular shape in cross section is directly used as the sample cell, and the reflection light from the surface of the sample cell can be removed from the detection target of the backscattered light detector.

According to the fifth technical feature of the present invention, irrespective of the sectional shape of the sample cell, the reflection light from the surface of the sample cell can be removed from the detection target of the backscattered light detector.

According to the sixth technical feature of the present invention, the reflection light from the surface of the sample cell can be removed from the detection target of the backscattered light detector by elaborating the incident portion surface of the sample cell.

According to the seventh technical feature of the present invention, of the light scattered in the mixed solution, in the sample cell, the light traveling toward the backscattered light detector can be guided to the backscattered light detector without being inhibited by the presence of the light source.

According to the eighth technical feature of the present invention, as compared to the optical system in which light is converged with the position of the incident portion surface of the sample cell being the focus position, scattered light information from the gel particle produced in the vicinity of the inner wall of the sample cell can be detected accurately by the backscattered light detector.

According to the ninth technical feature of the present invention, as compared to the optical system in which light is converged with the position of the incident portion surface of the sample cell being the focus position, only scattered light information from the gel particle produced in the vicinity of the inner wall of the sample cell can be detected accurately by the backscattered light detector.

According to the tenth technical feature of the present invention, of the light scattered in the mixed solution in the sample cell, a light component traveling toward the backscattered light detector can be guided to the backscattered light detector without influencing incident light from the light source.

According to the eleventh technical feature of the present invention, the gelation reaction under continuous stirring condition can be stably performed under a thermostatic environment.

According to the twelfth technical feature of the present invention, it is possible to effectively avoid the situation in which the stray light component generated by one of transmission and scattering on the inner wall of the sample cell other than the backscattered light component is mistakenly detected by the backscattered light detector.

According to the thirteenth technical feature of the present invention, the measurement results of the measurement device can be visually observed.

According to the fourteenth technical feature of the present invention, as compared to the mode in which the second scattered light detector is not used, the fluctuation component of the (forward or side) scattered light other than the backscattered light, as well as the fluctuation component of the backscattered light, can be measured, and hence production state information on the other gel particle can be determined accurately in addition to the production start time point of the gel particle in the mixed solution.

According to the fifteenth technical feature of the present invention, the present invention can be applied to quantification of an endotoxin.

BRIEF DESCRIPTION OF THE DRAWINGS

FIG. 3 is an explanatory diagram for schematically illustrating a process of the gelation reaction of an endotoxin when a *limulus* reagent is used.

FIG. 43 is an explanatory diagram for illustrating a luminous intensity distribution of the scattered light in association with a change in particle diameter of the gel particle.

FIG. 5 is an explanatory diagram for illustrating a gel particle measuring apparatus according to a first embodiment of the present invention.

FIG. 6 is an explanatory diagram for schematically illustrating a peripheral structure of a sample cell of the gel particle measuring apparatus according to the first embodiment.

FIG. 7A is an exploded perspective diagram for illustrating the sample cell to be used in the first embodiment, and FIG. 7B is a sectional explanatory diagram thereof.

FIG. 16 is an explanatory diagram for illustrating a gel particle measuring apparatus according to a third embodiment of the present invention.

FIG. 17 is a graph for showing results obtained by measuring each gelation start time of the same samples having different endotoxin concentrations by a gel particle measuring apparatus according to Example 1 (backscattering detecting system (BS)) and a gel particle measuring apparatus according to Comparative Example 1 (forward scattering detecting system (FS)).

DESCRIPTION OF THE EMBODIMENTS

Overview of Embodiments

Figure 1A:
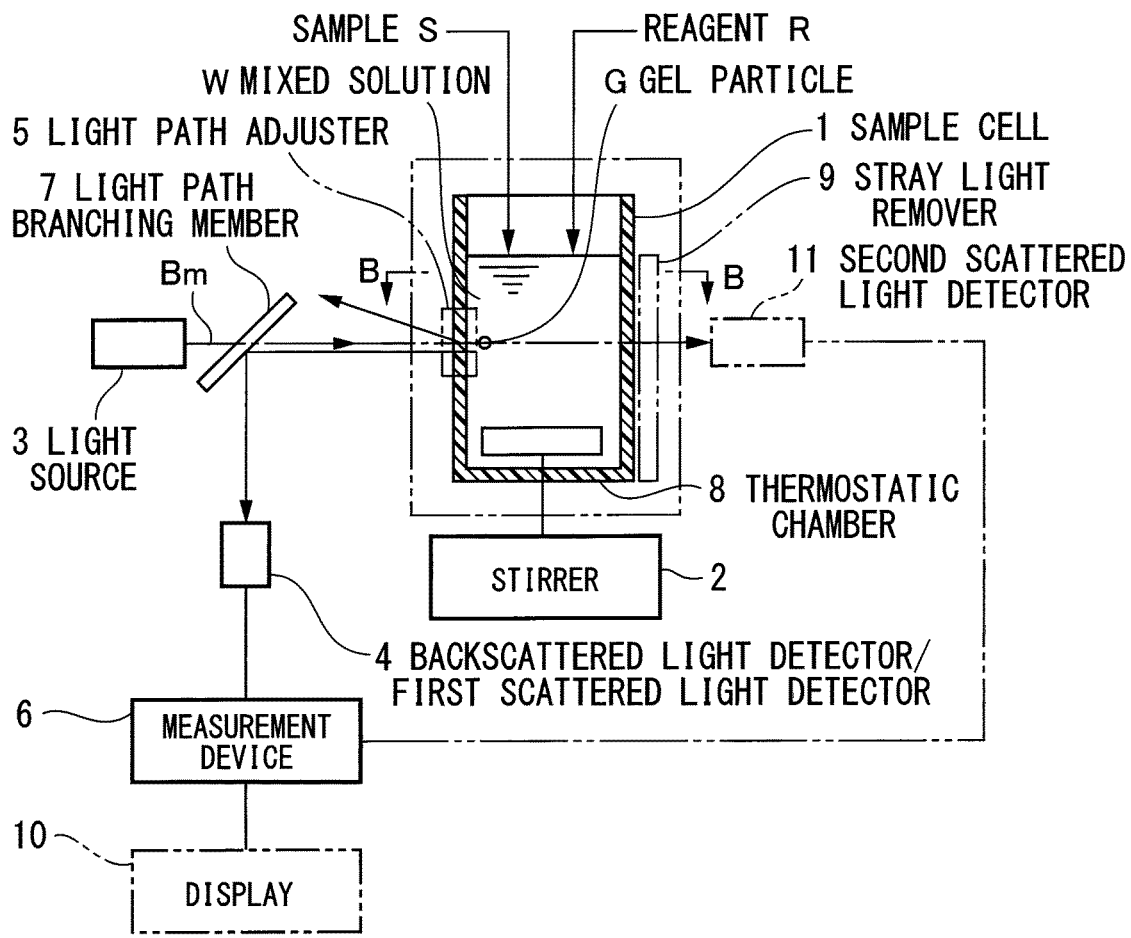
FIG. 1A is an explanatory diagram for illustrating an overview of an embodiment of a gel particle measuring apparatus to which the present invention is applied.
Figure 1B:
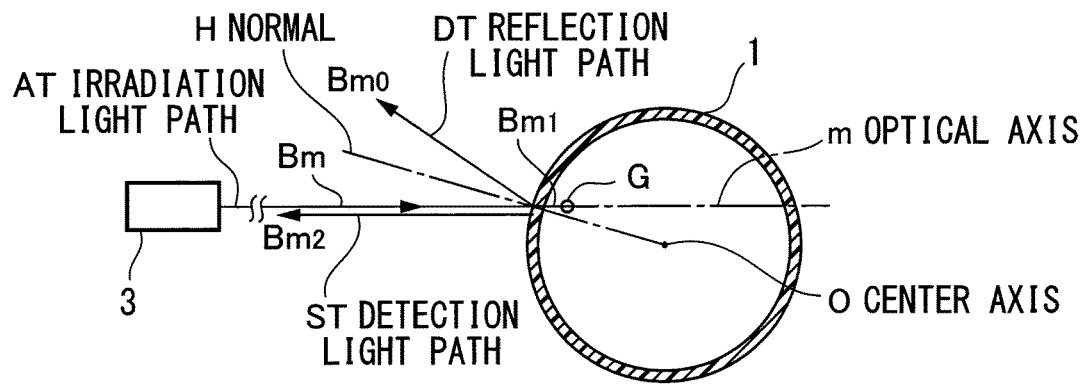
FIG. 1B is a sectional diagram taken along the line B-B of FIG. 1A.

FIG. 1A and FIG. 1B are each an explanatory diagram for illustrating an overview of a gel particle measuring method according to an embodiment to which the present invention is applied.

In FIG. 1A and FIG. 1B, the gel particle measuring method is a method of measuring gel particles G produced from a target substance in a sample S through a gelation reaction. The method uses a sample cell 1, which has, in at least part thereof, an incident portion through which light enters, and is configured to accommodate the sample S containing the target substance to be measured and a solution containing a reagent R for causing gelation of the target substance; a stirrer 2 configured to continuously stir a mixed solution W including the sample S and the reagent R in the sample cell 1 so as to inhibit gelation of the mixed solution W as a whole; a light source 3, which is arranged outside the incident portion of the sample cell 1, and is configured to irradiate the mixed solution W in the sample cell 1 with coherent light Bm; and a backscattered light detector 4, which is arranged outside the incident portion of the sample cell 1 and on the same side as the light source 3, and is configured to detect, out of light scattered in the mixed solution W in the sample cell 1, a backscattered light component returning toward the light source 3. The method includes: a stirring step of continuously stirring the mixed solution W with the stirrer 2 under a state in which the mixed solution W is accommodated in the sample cell 1; a light separating step of, during the stirring step, causing the irradiation light Bm from the light source 3 to enter the mixed solution W, making a reflection light path DT of light reflected from a surface of the sample cell 1 different from a detection light path ST of light traveling toward the backscattered light detector 4, and capturing the light component scattered in the mixed solution W with the backscattered light detector 4; and a measuring step of measuring a fluctuation component of the scattered light based on a detection output of the backscattered light detector 4 obtained through the light separating step and determining a production state of the gel particles G including at least a production start time point of the gel particles G in the mixed solution W leading to a time point at which the mixed solution W changes in phase from a sol phase to a gel phase.

In the technical means described above, the target substance of the present invention encompasses a wide range of substances as long as the substances are subjected to a gelation reaction with a predetermined reagent R to produce the gel particles G. Examples of the target substance include an endotoxin and a β-D-glucan. Here, when the target substance is an endotoxin, as the reagent R for gelating the endotoxin, there is typically given a *limulus* reagent (reagent derived from a *limulus* amebocyte lysate of the American horse-shoe crab, *Limulus polyphemus*). However, the reagent R is not limited thereto, and may be a reagent derived from another genus *Tachypleus tridentus* or a reagent derived from a hemocyte of an organism equivalent to the horse-shoe crab.

In addition, it is only required that the sample cell 1 have, in at least part thereof, the incident portion through which light enters. The shape of the sample cell 1 is not limited to the shape having a cylindrical peripheral wall and may have a polygonal peripheral wall.

Further, the stirrer 2 encompasses a wide range of stirrers as long as the stirrers have a stirring action on the mixed solution W including the sample S and the reagent R. Needless to say, a mode in which the stirrer is built in and directly performs stirring may be used, and any mode of providing the stirring action may be appropriately selected. There are given, for example, a mode of providing the stirring action by air and a mode of providing the stirring action by shaking.

Further, the light source 3 is not limited to a laser light source for emitting laser light as long as the light source emits coherent light. For example, the coherent light may also be generated by causing monochromatic light, such as light of a sodium lamp, to pass through a pinhole. In addition, the light source 3 may be arranged in the vicinity of an outer side of the sample cell 1. Alternatively, the light source 3 may be arranged at a position away from the sample cell 1 so that light is guided to the incident portion of the sample cell 1 through intermediation of various optical components (an imaging member, a reflection member, a diaphragm member, an optical fiber, and the like).

In addition, it is only required that the backscattered light detector 4 be configured to detect, out of light scattered in the mixed solution W including the sample S and the reagent R in light having entered the sample cell 1 from the light source 3, a backscattered light component returning toward the light source 3. In this case, the backscattered light detector 4 may be arranged in the vicinity of an outer side of the sample cell 1. Alternatively, the backscattered light detector 4 may be arranged at a position away from the sample cell 1 so that light is guided to the position through optical components.

In addition, in this embodiment, it is only required that the gel particle measuring method include performing the measuring step after the stirring step and the light separating step through use of the above-mentioned components.

Here, the stirring step is required to include continuously stirring the mixed solution W in the sample cell 1 with the stirrer 2 so as to inhibit gelation of the mixed solution W as a whole, and it is required to continuously perform the stirring step while performing the light separating step and the measuring step.

In addition, in the light separating step, as illustrated in FIG. 1B, the light Bm radiated from the light source 3 contains a light $Bm_1$ component transmitted through the sample cell 1 and a light $Bm_0$ component reflected from the surface of the sample cell 1, and a procedure for separating light may be appropriately selected as long as the procedure involves making a reflection light path DT of the light $Bm_0$ reflected from the surface of the sample cell 1 different from a detection light path ST of backscattered light $Bm_2$ that is scattered in the mixed solution W in the sample cell 1 to travel toward the backscattered light detector 4.

Further, the measuring step is required to include measuring a fluctuation component of the scattered light based on a detection output of the backscattered light detector 4, and as a procedure for measuring a fluctuation component, there is given, for example, a procedure of averaging or smoothing and filtering the detection output. Further, it is only required that the measuring step include determining a production state of the gel particles G including at least a production start time point of the gel particles G in the mixed solution W leading to a time point at which the mixed solution W changes in phase from a sol phase to a gel phase based on measurement results. Here, the phrase "production state of the gel particles G" widely includes, in addition to the production start (emergence) time point of the gel particles G, for example, a change in production process of the gel particles G, a production finish time point of the gel particles G, and a production amount of the gel particles G. The phrase "determine the production state of the gel particles G" includes, needless to say, direct determination of information on the production state of the gel particles G, and also includes determination of information that can be determined based on the production state of the gel particles G (for example, quantified information on a target substance).

In addition, as a preferred mode of the light separating step, there is given a mode in which the detection light path ST includes a part of an irradiation light path AT of the light Bm radiated from the light source 3 to the sample cell 1.

It is only required that the light separating step include separating the reflection light path DT and the detection light path ST from each other, and the light separating step also includes a mode in which the irradiation light path AT of the light Bm radiated from the light source 3 to the sample cell 1 is not matched with the detection light path ST toward the backscattered light detector 4. From the viewpoint of capturing a scattered light component traveling in a true back-scattering direction, it is preferred that the detection light path ST follow the same light path as the irradiation light path AT. Here, in most modes, the light source 3 and the backscattered light detector 4 are generally set at different places. However, in this mode, in order to enable a detection operation by the backscattered light detector 4, it is required that the detection light path ST be branched from the middle of the irradiation light path AT. However, the present invention is not limited thereto in a mode using a device in which the light source 3 and the backscattered light detector 4 are integrated.

In addition, an overview of a gel particle measuring apparatus that implements the gel particle measuring method according to the embodiment is as follows.

In FIG. 1A and FIG. 1B, the gel particle measuring apparatus is used for measuring the gel particles G produced from the target substance in the sample S through the gelation reaction, and includes: the sample cell 1, which has, in at least part thereof, the incident portion through which light enters, and is configured to accommodate the sample S containing the target substance to be measured and the solution containing the reagent R for causing gelation of the target substance; the stirrer 2 configured to continuously stir the mixed solution W including the sample S and the reagent R in the sample cell 1 so as to inhibit gelation of the mixed solution W as a whole; the light source 3, which is arranged outside the incident portion of the sample cell 1, and is configured to irradiate the mixed solution W in the sample cell 1 with the coherent light Bm during the stirring of the mixed solution W by the stirrer 2; the backscattered light detector 4, which is arranged outside the incident portion of the sample cell 1 and on the same side as the light source 3, and is configured to detect, out of the light scattered in the mixed solution W in the sample cell 1, the backscattered light component returning toward the light source 3; a light path adjuster 5 configured to, when irradiation light from the light source 3 enters the incident portion of the sample cell 1, adjust an incident portion surface of the sample cell 1 so that the detection light path ST of, out of light scattered in the mixed solution W in the sample cell 1, light traveling toward the backscattered light detector 4 is different from the reflection light path DT of the light $Bm_0$ reflected from the surface of the sample cell 1; and a measurement device 6 configured to measure a fluctuation component of the scattered light based on a detection output of the backscattered light detector 4 and determine a production state of the gel particles G including at least a production start time point of the gel particles G in the mixed solution W leading to a time point at which the mixed solution W changes in phase from a sol phase to a gel phase.

Here, as the light path adjuster 5, any adjuster may be appropriately selected as long as the adjuster can adjust the incident portion surface of the sample cell 1 so that the reflection light path DT of, out of the light radiated from the light source 3 to the incident portion of the sample cell 1, light reflected from the incident portion surface of the sample cell 1 is different from the detection light path ST of, out of the light scattered in the mixed solution W in the sample cell 1, light traveling toward the backscattered light detector 4.

As typical modes of the light path adjuster 5, there are given the following modes.

As a typical mode 1, as illustrated in FIG. 1B, there is given a mode in which the sample cell 1 includes a bottomed tubular container having a circular shape in cross section with at least the incident portion being penetrable, and the light path adjuster 5 is configured to arrange an optical axis m from the light source 3 so that the optical axis m passes through a position being offset from a center axis O of the tubular container.

It is required to select a displacement amount between the optical axis m from the light source 3 and an imaginary light path that is parallel to the optical axis m and passes through the center axis O of the tubular container of the sample cell 1 so that at least a part of the irradiation light Bm from the light source 3 is transmitted through the peripheral wall of the sample cell 1, in consideration of an outer diameter and a thickness, and further a material (refractive index of light) of the sample cell 1. That is, when the displacement amount is set to be an excessively large amount, there is a risk in that the irradiation light Bm from the light source 3 may be totally reflected from the incident portion surface of the sample cell 1. Therefore, it is only required that the displacement amount be set so as to avoid the above-mentioned risk.

This example is based on the mode in which the sample cell 1 has a bottomed tubular container having a circular shape in cross section. When the optical axis m from the light source 3 is arranged so as to pass through a position displaced from the center axis O of the tubular container, the light Bm radiated from the light source 3 enters the sample cell 1 in a direction crossing a normal H direction of the surface of the tubular container at an acute angle, and hence the light Bm is specularly reflected at substantially the same angle as the incident angle with the normal H direction interposed therebetween. Therefore, the light $Bm_0$ radiated from the light source 3 and reflected from the surface of the sample cell 1 travels toward the reflection light path DT in a direction different from that of the detection light path ST toward the backscattered light detector 4.

In this case, the reflection light path DT of, out of the irradiation light Bm from the light source 3, the light $Bm_0$ reflected from the surface of the sample cell 1 (tubular container) is separated from the detection light path ST of, out of the light scattered in the mixed solution W in the sample cell 1, the light $Bm_2$ traveling toward the backscattered light detector 4, and hence there is little risk in that the light of the reflection light path DT is mixed into the detection light path ST.

In addition, as a typical mode 2 of the light path adjuster 5, there is given a mode in which the center axis O of the sample cell 1 and the optical axis m of the light source 3 are arranged so as to be inclined from an orthogonal position therebetween. In this example, irrespective of the sectional shape of the sample cell 1, the reflection light path DT of the light reflected from the surface of the sample cell 1 is arranged so as to be inclined from a horizontal surface including the optical axis m of the light source 3. In this case, as an inclination angle of the sample cell 1, an angle required for separating the reflection light path DT and the detection light path ST from each other is selected, and further, the inclination angle may be appropriately selected within a range capable of implementing a stirring operation and the like of the stirrer 2.

Further, as a typical mode 3 of the light path adjuster 5, there is given a mode in which the light path adjuster 5 includes a reflection surface that is formed in advance in the incident portion of the sample cell 1 so that the reflection light $Bm_0$ reflected from the incident portion surface out of the irradiation light Bm from the light source 3 travels toward a direction different from a direction toward the backscattered light detector 4. In this example, a desired reflection surface is formed in the incident portion of the sample cell 1, to thereby guide the light reflected from the incident portion of the sample cell 1 to the reflection light path DT in the direction different from that of the detection light path ST toward the backscattered light detector 4.

Further, needless to say, the typical modes 1 to 3 of the light path adjuster 5 may be appropriately combined.

In this embodiment, the optical system may be appropriately selected as long as the optical system includes at least the light source 3, the backscattered light detector 4, and the light path adjuster 5. As preferred modes of the optical system, there are given the following modes.

As a preferred mode 1 of the optical system, there is given a mode in which the optical system includes a light path branching member 7 configured to transmit the irradiation light Bm radiated from the light source 3 to the incident portion of the sample cell 1 and branch the detection light path ST of, out of the light scattered in the mixed solution W, the backscattered light $Bm_2$ traveling toward the backscattered light detector 4, from the middle of the irradiation light path AT from the light source 3. In this example, the light path branching member 7 is arranged in the middle of the irradiation light path AT from the light source 3 toward the sample cell 1, and it is only required that the light path branching member 7 have a function of transmitting the irradiation light Bm from the light source 3 and a function of branching the detection light path ST of the backscattered light $Bm_2$ traveling from the sample cell 1 toward the backscattered light detector 4 from the middle of the irradiation light path AT from the light source 3. It is only required that, in the light path branching member 7, for example, a reflection member partially have a hole for transmitting the irradiation light Bm from the light source 3 or an optical member configured to transmit light from one side and reflect light from the other side be used.

In addition, as a preferred mode 2 of the optical system, there is given a mode in which the optical system includes an imaging member (not shown) for incidence configured to cause the irradiation light Bm from the light source 3 to be converged with a proximity position after the irradiation light Bm has passed through an inner wall of the sample cell 1 being a focus position, and an imaging member (not shown) for detection configured to cause the backscattered light $Bm_2$ traveling toward the backscattered light detector 4 to be converged with a detection surface of the backscattered light detector 4 being a conjugate focus position (see a first embodiment illustrated in FIG. 5).

This example corresponds to the mode in which the irradiation light Bm radiated from the light source 3 is converged with a proximity position after the irradiation light Bm has passed through the inner wall of the sample cell 1 being a focus position, and hence the light scattered from the gel particles G in the vicinity of the focus position travels toward the backscattered light detector 4 to be converged with the detection surface of the backscattered light detector 4 being a conjugate focus position. Therefore, the scattered light information on the gel particles G produced in the vicinity of the inner wall of the sample cell 1 is detected under a state of being focused on the backscattered light detector 4.

Figure 14:
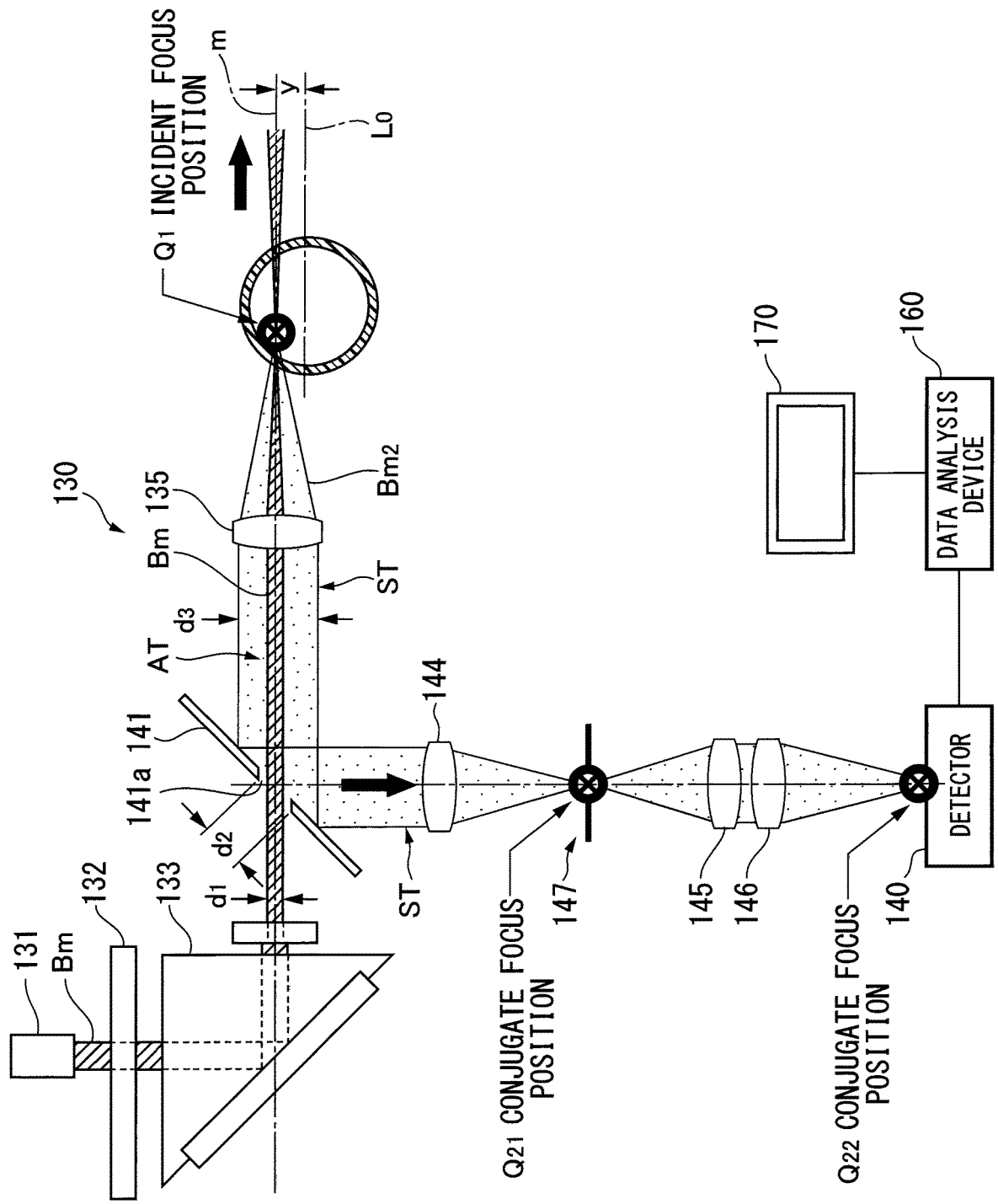
FIG. 14 is an explanatory diagram for illustrating a gel particle measuring apparatus according to a second embodiment of the present invention.

Further, as a preferred mode of the optical system, there is given a mode in which the optical system includes: an imaging member for incidence (not shown) configured to cause the irradiation light Bm from the light source 3 to be converged with a proximity position after the irradiation light Bm has passed through an inner wall of the sample cell 1 being a focus position; a first imaging member for detection (not shown) configured to cause the backscattered light $Bm_2$ traveling toward the backscattered light detector 4 to be converged with a position of a diaphragm member (not shown) being a conjugate focus position, the diaphragm member being arranged in the middle of the detection light path ST toward the backscattered light detector 4; and a second imaging member for detection (not shown) configured to cause the light having passed through the diaphragm member to be converged with a detection surface of the backscattered light detector 4 being a conjugate focus position (see a second embodiment illustrated in FIG. 14).

This example corresponds to the mode in which the irradiation light Bm radiated from the light source 3 is converged with the proximity position after the irradiation light Bm has passed through the inner wall of the sample cell 1 being a focus position. Therefore, the light scattered from the gel particles G in the vicinity of the focus position travels toward the backscattered light detector 4 to be converged with the position of the diaphragm member (for example, a pinhole) being a conjugate focus position, and then the light having passed through the diaphragm member is converged with the detection surface of the backscattered light detector 4 being a conjugate focus position. Therefore, the scattered light from the gel particles G produced in the vicinity of the inner wall of the sample cell 1 passes through the diaphragm member, but the other scattered light does not pass, through the diaphragm member, with the result that only the scattered light from the gel particles G is detected under a state of being focused on the backscattered light detector 4.

In addition, as a preferred mode 4 of the optical system, there is given a mode in which the optical system is configured to narrow down a light beam traveling from the light source 3 toward the sample cell 1 through a diaphragm member (not shown) and set the light beam to be narrower than, out of the light scattered in the mixed solution W, a light beam traveling toward the backscattered light detector 4. In this example, the light beam narrowed down is radiated to the mixed solution W in the sample cell 1, and the light beam scattered in the mixed solution W and traveling toward the backscattered light detector 4 is guided from the periphery of the light beam of incident light.

In addition, as a preferred mode of the sample cell 1, there is given a mode in which the sample cell 1 is arranged in a thermostatic chamber 8 from the viewpoint that the gelation reaction is performed under a thermostatic environment.

Further, as another preferred mode of the sample cell 1, there is given a mode in which the sample cell 1 includes, in the sample cell 1 or around the sample cell 1, a stray light remover 9 configured to remove a stray light component generated by one of transmission and scattering on an inner wall of the sample cell 1 other than, out of the irradiation light Bm from the light source 3, a backscattered light component traveling toward the backscattered light detector 4 in the mixed solution W.

When the light having entered the incident portion of the sample cell 1 is reflected and scattered by the peripheral wall (outer wall, inner wall) of the sample cell 1 different from the incident portion, there is a risk in that a part of the reflected and scattered light is mistakenly captured as stray light by the backscattered light detector 4. Therefore, the above-mentioned example adopts a configuration in which such stray light influencing the detection is not generated. Here, as the stray light remover 9, an absorbing member capable of absorbing a stray light component is provided to the peripheral wall of the sample cell 1, or a rough surface capable of diffusely reflecting a stray light component is provided to the inner wall of the sample cell 1. Thus, the remover may be appropriately selected.

Further, from the viewpoint of visually observing the measurement results of the measurement device 6, it is preferred that a display 10 configured to display the measurement results of the measurement device 6 be provided.

Further, in this embodiment, the gel particle measuring apparatus includes: a first scattered light detector, which is the backscattered light detector 4 described above; and a second scattered light detector 11 configured to detect a scattered light component other than, out of the light scattered in the mixed solution W, the backscattered light component returning toward the light source 3. The measurement, device 6 may be configured to determine the production state of the gel particles G including the production start time point of the gel particles G in the mixed solution W based on measurement results of the fluctuation component of the detection output of the first scattered light detector 4 and may be configured to determine a production state of the gel particles G, other than the production state of the gel particles G including the production start time point of the gel particles G in the mixed solution W, based on measurement results of a fluctuation component of one of detection outputs of the first scattered light detector 4 and the second scattered light detector 11 and a detection output of the second scattered light detector 11.

That is, the production state of the gel particles G including the production start time point of the gel particles G in the mixed solution W is determined based on the fluctuation component of the detection output of the first scattered light detector 4, and the production state of the gel particles G, other than the production state of the gel particles G including the production start time point of the gel particles G in the mixed solution W, is determined based on the fluctuation component of one of the detection outputs of the first scattered light detector 4 and the second scattered light detector 11 and the detection output of the second scattered light detector 11.

Next, an operation of the gel particle measuring apparatus illustrated in FIG. 1A and FIG. 1B is described.

Figure 2A:
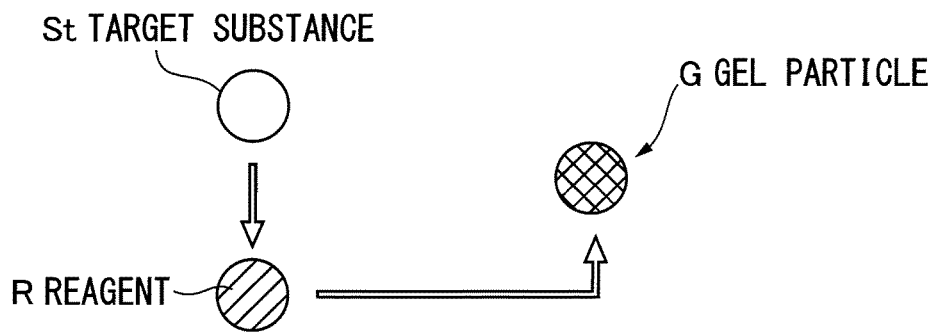
FIG. 2A is an explanatory diagram for schematically illustrating a gelation reaction.

First, a gelation reaction is schematically illustrated in FIG. 2A.

In FIG. 2A, when a reagent R that specifically reacts with a target substance St in a sample S is present, a phenomenon in which the target substance St specifically reacts with the reagent R at a ratio dependent on the concentration of the target substance St in the sample S occurs. In the process of the reaction, a given factor in the reagent R is activated by the stimulation with the target substance St, resulting in activation of a given enzyme. Upon the activation, for example, a water-soluble protein is converted to an insoluble protein through a decomposition reaction caused by the enzyme, leading to emergence of a gel particle G.

More specifically, an endotoxin is taken as an example, and a process of the gelation reaction of the endotoxin is schematically illustrated in FIG. 3.

In FIG. 3, when the stimulation with the endotoxin illustrated in (1) is delivered to, for example, a *limulus* reagent, Factor C is first activated into Activated Factor C as illustrated in (2). Next, the action of Activated Factor C causes the activation of Factor B to produce Activated Factor B as illustrated in (3). After that, the action of Activated Factor B causes the conversion of a pro-clotting enzyme to a clotting enzyme as illustrated in (4). As illustrated in (5), the clotting enzyme decomposes coagulogen (water-soluble protein) to produce coagulin (insoluble protein). When gelation of the coagulin (insoluble protein) as a whole is inhibited by stirring under this condition, a gel particle G of the coagulin emerges. Meanwhile, when the resultant is left to stand still, the solution system as a whole is subjected to polymerization and gelation as illustrated in (6).

That is, in the case where the target substance St in the sample S is an endotoxin, when the stimulation of the endotoxin is delivered to the *limulus* reagent R while a certain stirring state is given to a mixed solution W to inhibit the gelation of the mixed solution Was a whole, the *limulus* reagent R can cause the production of the gel particles G of coagulin (insoluble protein) around the clotting enzyme. Thus, it is understood that after the gel particles G of coagulin (insoluble protein) are produced, a reaction process in which the gel particles G are subsequently produced is followed.

In addition, it has been found that a rate at which the stimulation with the endotoxin is delivered to a reaction flow (cascade) of the *limulus* reagent R (*limulus* response rate) is dependent on an endotoxin concentration, and that as the endotoxin concentration becomes higher, the *limulus* response rate becomes higher, and the emergence timing of the gel particles G made of coagulin (insoluble protein) becomes earlier.

Thus, when changes in scattered light are detected with high accuracy, the emergence timing of the gel particles G made of coagulin (insoluble protein) can be grasped as the production start time point of the gel particles G. This is a fundamental of the measuring principle of the gel particle measuring apparatus according to this embodiment.

The measuring principle of such gel particle measuring apparatus is completely different from, for example, the measuring principle of the related-art gelation method or the related-art turbidimetric time assay (the mode in which, in the reaction process by the *limulus* reagent R under a static condition, gelation finally occurs owing to the influence of an activated clotting enzyme, and the gelation process is quantitatively measured based on the turbidity).

Figure 2B:
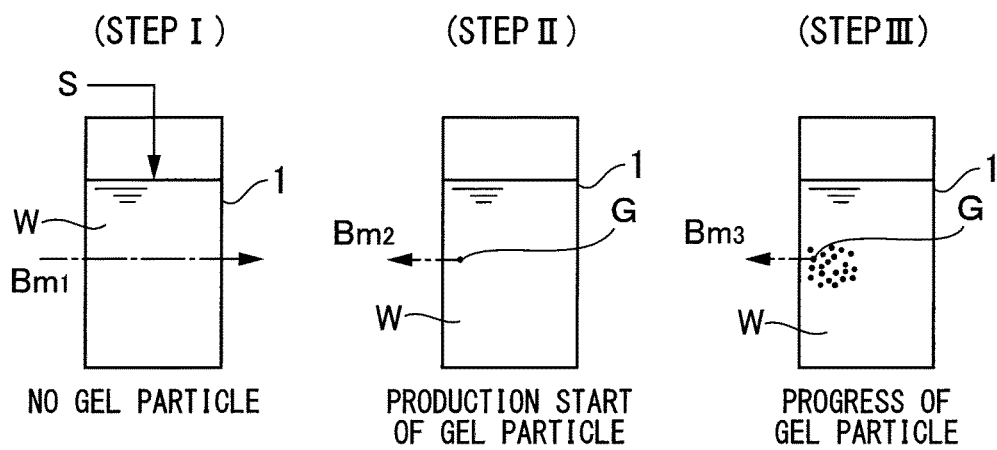
FIG. 2B is an explanatory diagram for illustrating progressing steps I to III of the gelation reaction.

Here, the measuring principle of the gel particle measuring apparatus is schematically illustrated in FIG. 2B.

Figure 2C:
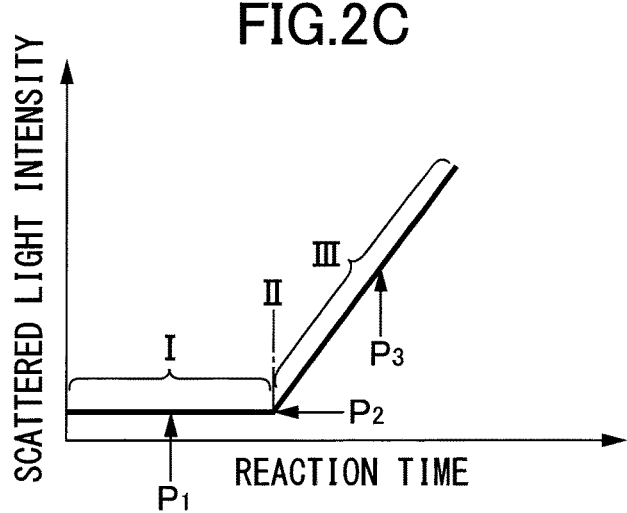
FIG. 2C is a graph for showing a relationship between a reaction time and a scattered light intensity in the progressing steps of the gelation reaction.

In the gel particle measuring apparatus according to this embodiment, as illustrated in Step I of FIG. 2B, in the case where the mixed solution W including the sample S and the solution containing the reagent R is free of the gel particles G (corresponding to the case in which the mixed solution W is in a sol phase), the irradiation light Bm entering the sample cell 1 from the light source 3 (see FIG. 1A) is not shielded by the gel particles G. Thus, the irradiation light Bm is not scattered from the gel particles G, and needless to say, there is no backscattered light component returning backward on the light source 3 side. Therefore, a scattered, light intensity detected by, the backscattered light detector 4 is kept nearly zero (see $P_1$ of Step I in FIG. 2C).

Then, as illustrated in Step II of FIG. 2B, in the case where the production of the gel particles G starts in the mixed solution W including the sample S and the solution containing the reagent R (corresponding to the case in which the mixed solution W starts changing in phase from a sol phase to a gel phase), when the gel particles G of coagulin (insoluble protein) in the case of, for example, an endotoxin start being produced, a part of the irradiation light Bm having entered the sample cell 1 from the light source 3 is partially shielded by the presence of the produced gel particles G made of coagulin (insoluble protein). As a result, a part of the irradiation light Bm is scattered, and out of the scattered light, the backscattered light $Bm_2$ component returning toward the light source 3 is detected by the backscattered light detector 4. Therefore, the detection output of the backscattered light detector 4 starts changing to rise from a zero level, which is a stable region (see $P_2$ of Step II in FIG. 2C). In this case, the backscattered light $Bm_2$ immediately after the sample cell 1 which the irradiation light Bm impinges on is hardly attenuated by the solvent to be detected.

At this time, in this example, the irradiation light Bm from the light source 3 to the sample cell 1 is reflected as the reflection light $Bm_0$ from the surface of the sample cell 1 besides the transmitted light $Bm_1$ entering the sample cell 1 as illustrated in FIG. 1A and FIG. 1B. However, in this example, the incident portion surface of the sample cell 1 is adjusted by the light path adjuster 5, and hence the detection light path ST of the backscattered light $Bm_2$ traveling toward the backscattered light detector 4 and the reflection light path DT of the reflection light $Bm_0$ reflected from the surface of the sample cell 1 are different from each other. Therefore, there is no risk in that the reflection light $Bm_0$ component is mixed into the detection light path ST toward the backscattered light detector 4 to be detected.

After that, as illustrated in Step III in FIG. 2B, when the production of the gel particles G gradually progresses in the mixed solution W including the sample S and the solution containing the reagent R, irradiation light $Bm_3$ having entered the sample cell 1 from the light source 3 gradually increases in scattering degree due to the presence of a number of gel particles G sequentially produced. As a result, the backscattered light $Bm_3$ component returning backward on the light source 3 side, which is detected by the backscattered light detector 4, also gradually increases. Therefore, the detection output of the backscattered light detector 4 sequentially increases, and the scattered light intensity to be detected by the backscattered light detector 4 starts changing to rise sequentially at a change point $P_2$ (see $P_3$ of Step III in FIG. 2C). Meanwhile, when the scattered light intensity increases to some degree, the intensities of forward scattered light and side scattered light also increase more than attenuation by the solvent to be detected. However, scattering in an initial stage is not detected due to attenuation, and detection of backscattered light immediately after the sample cell 1 is delayed.

In the embodiment described above, description is given to the mode in which the production start time point of the gel particles G leading to the timing of phase change of the mixed solution W from a sol phase to a gel phase is determined significantly promptly as compared to scattering in the other directions, based on the fluctuation component of the backscattered light of the irradiation light Bm radiated to the mixed solution W (corresponding to $P_2$ of Step II in FIG. 2B).

In general, there is a primary demand for measuring an endotoxin in a clinical sample simply and promptly particularly for the purpose of emergency medical care.

The "insufficient measurement caused by poor sensitivity" and "inconvenience caused by a long measuring time", which are problems in the related-art turbidimetric time assay, are reliably solved by the above-mentioned measuring system.

That is, in principle, the gel particle measuring apparatus according to this embodiment is capable of uniformly stirring a mixed solution including a sample and a *limulus* reagent to produce minute gel particles locally instead of the mixed solution system as a whole under the uniform reaction, applying uniform coherent light, such as laser light, to the gel particles to cause scattering, detecting the scattered light to detect a phase change point leading to a phase change from a sol phase to a gel phase, which is emergence of the gel particles caused by the addition of an endotoxin, and measuring a time period until the phase change point, thereby estimating the amount of the endotoxin in the *limulus* reagent.

In summary, the gel particle measuring apparatus according to this embodiment is constructed based on the fact that the timing (production start time point of gel particles under continuous stirring condition) of the occurrence of a phase change is dependent on an endotoxin, without following a change (gelation) of the mixed solution system as a whole. With this, the gel particle measuring apparatus according to this embodiment can promptly detect an endotoxin as compared to the related-art turbidimetric time assay.

In particular, in this embodiment, out of the scattered light, a backscattered light component returning backward on the light source 3 side is paid attention to. The reason for this is as follows.

Figure 4A:
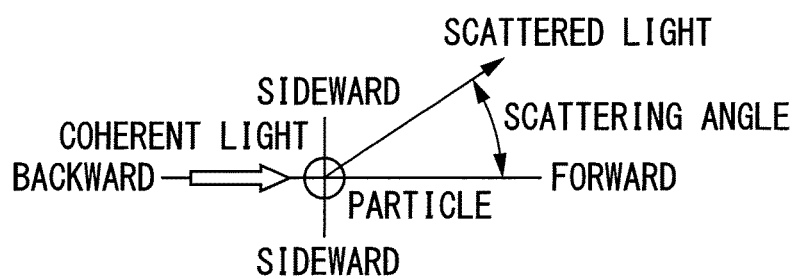
FIG. 4A is an explanatory diagram for illustrating a scattering direction of scattered light when a gel particle is irradiated with coherent light.
Figure 4B:
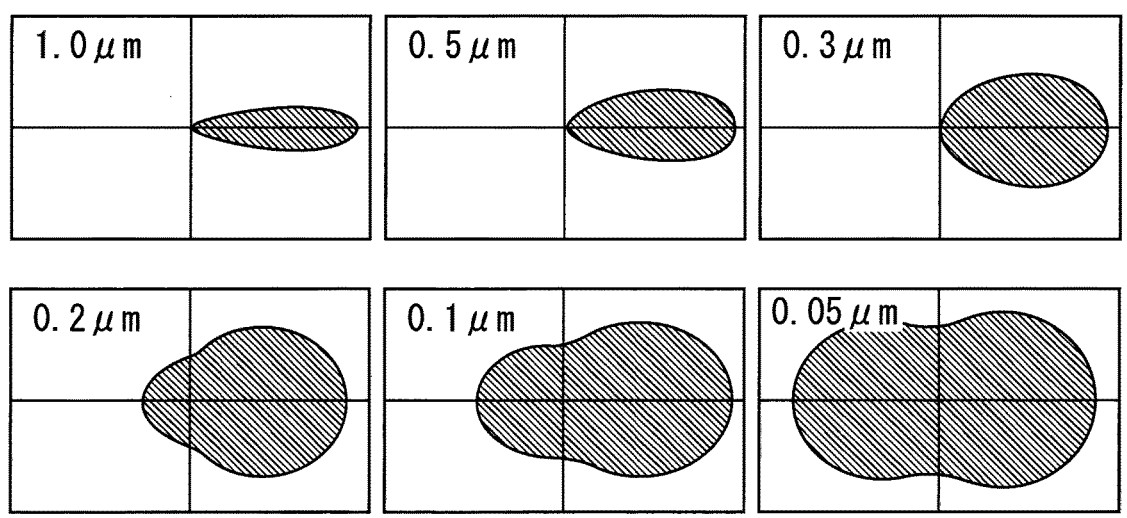

In general, as illustrated in FIG. 4A, a model in which a particle is irradiated with uniform coherent light, for example, laser light is assumed. It has been widely known that the coherent light is scattered due to the presence of the particle. A relationship between the size of the particle and the scattered light in such scattering phenomenon was investigated to find a relationship between the intensity and the directivity of the scattered light generated by incidence of single light, for example, as illustrated in FIG. 4B. In FIG. 4B, as the scattering phenomenon, there are forward scattering, which occurs in the same direction as that of light entering the particle, side scattering, which occurs in a direction orthogonal to that of the incident light, and backscattering, which occurs in a direction opposite to that of the incident light.

In the above-mentioned scattering phenomenon, when the size of the particle and the direction of scattering are taken into consideration, leaving energy to be generated aside, forward scattering becomes dominant as the particle increases in size, and scattering in all directions including backscattering is observed when the particle is small. Based on the observation results, it can be said that the forward scattering is advantageous for capturing a large particle. Meanwhile, in order to promptly capture a small particle produced first under a phenomenon in which the particle is produced from nothing to grow, any directions may be suitable. However, based on the fact that the energy is small, when the attenuation of scattered light in a solvent in which the particle is present is taken into consideration, backscattering in which attenuation is small (absorption caused by the influence of the solvent is small) may be suitable.

In particular, the gel particle measuring apparatus according to this embodiment captures a particle produced from nothing (phase change called gelation). Therefore, it is presumed that gel particle detection based on backscattering under irradiation of the sample cell with incident light is superior to scattering detection in any other directions for the purpose of detecting a produced minute particle as promptly as possible.

As described above, in order to detect minute particle emergence due to a phase change caused by, for example, a *limulus* reagent promptly with satisfactory sensitivity, timing of the phase change is measured through use of the detecting system based on backscattering.

In short, the system of detecting a backscattered light component out of the scattered light generated due to the emergence of a minute particle is excellent in the following two points: a small particle can be detected promptly even in the same reaction; and scattered light can be detected without being attenuated by a solvent in which the particle floats.

Now, the present invention is described in more detail based on embodiments illustrated in the accompanying drawings.

First Embodiment

In a gel particle measuring apparatus according to a first embodiment, a sample containing an endotoxin as a target substance is used as the sample S, and a reagent that causes a gelation reaction with the endotoxin, which is the target substance, is used as the reagent R.

—Reagent—

In this embodiment, it is only required that the reagent R contain at least a reagent base that causes a gelation reaction with an endotoxin, and in order to accelerate formation of the gel particles G, a reagent containing a reagent base having a particle forming factor added thereto is used.

It is only required that the reagent base contain a factor (for example, an enzyme) causing a gelation reaction with a target substance. For example, when the target substance is an endotoxin or a β-D-glucan, there is typically given a *limulus* reagent. However, the reagent base is not limited to the *limulus* reagent. Needless to say, as long as a factor group contained in an amebocyte component of *limulus*, other than *Limulus polyphemus*, specifically reacts with an endotoxin or a β-D-glucan, a reagent base may be produced through use of a lysate of the amebocyte component.

In addition, the particle forming factor is added to the reagent base and is biologically inactive. The particle forming factor has solubility in the sample S and is dissolved at a concentration of from 0.002% to 1% to aggregate a product leading to the gel particles G. The concentration value of the particle forming factor as used herein is represented in terms of a percent by volume (v/v).

Now, additional description is given to the necessity of each requirement of the particle forming factor.

First, it is required that the particle forming factor be soluble in the sample S. The reason for this is that, when the particle forming factor is insoluble, there is a risk in that such insolubility may become an obstacle to accurate understanding of a production start time point of the gel particles G.

In addition, it is only required that the particle forming factor serve as an aggregating factor for accelerating aggregation of a product (for example, a product of an enzyme) to be a core leading to the gel particles G and exhibit an action of accelerating formation of the gel particles G. In this case, it is presumed that the particle forming factor exhibits an action of causing a *limulus* reaction final product coagulin leading to formation of the gel particles G to accumulate to a certain size. That is, when the particle forming factor is added, aggregation of the insoluble protein coagulin produced with the passage of time does not lead to various particles with unlimited and patternless sizes. Instead of this, a product leading to the gel particles G concentrated on particle sizes within a predetermined range (for example, a range biased to an S size smaller than the level of the particle size) is produced, and this product is aggregated to early lead to the gel particles G. The phrase "particle sizes within a predetermined range" as used herein refers to relatively small sizes at which the product is easily aggregated, and it is only required that the gel particles G fall within a certain size range.

Then, it is required that the particle forming factor have a concentration of from 0.002% to 1%. In this case, when the particle forming factor has a concentration of less than 0.002%, formation of the gel particles G is not controlled, and particles with small to large sizes are produced, with the result that formation of the gel particles G is suppressed. Meanwhile, when the particle forming factor has a concentration of more than 1%, an excessive amount of the particle forming factor is added, and coagulin molecules are dispersed to rather cause the interaction thereof to interfere with each other. As a result, there is a tendency that the aggregation reaction is suppressed.

Further, it is required that the particle forming factor be biologically inactive. For example, in the case of a factor having biological activity, the characteristics of the factor change in association with activity. Therefore, the action as, the factor becomes unstable, and in addition, there is a risk in that the factor may influence the reaction itself by the reagent base.

In addition, as a typical mode of the particle forming factor, there is given, for example, a soluble heat denatured protein. The heat-denatured protein encompasses plasma proteins, enzymes, vegetal proteins, egg albumin, and the like. For example, a plasma protein is obtained as a soluble heat-denatured protein by subjecting a diluted solution to heat treatment (for example, high-pressure sterilization treatment at 120° C. for 20 minutes).

Further, it is only required that the particle forming factor be a substance serving as a minute core for gelation, that is, particle formation. Therefore, the particle forming factor is not necessarily required to be a heat-denatured protein. As another typical mode of the particle forming factor, there is given a polymer derived from an organism or a porous fine particle derived from a petroleum polymer chemical component. It is also required that those factors be soluble and biologically inactive.

The above-mentioned polymer derived from an organism encompasses, for example, cellulose, polysaccharides, and glycoproteins. In addition, as the porous fine particle derived from a petroleum polymer chemical component, there is given, for example, a nanoparticle resin.

—Gel Particle Measuring Apparatus—

<Entire Configuration of Gel Particle Measuring Apparatus>

In this embodiment, the gel particle measuring apparatus is constructed as illustrated in FIG. 5 and FIG. 6.

In FIG. 5 and FIG. 6, the gel particle measuring apparatus includes a sample cell 100 into which a sample S containing an endotoxin is injected, and is configured to measure, for example, a concentration of the endotoxin as a target substance in the sample S through a gelation reaction using a reagent R (in this example, a reagent obtained by adding a particle forming factor to a *limulus* reagent).

In this example, the sample cell 100 is set on a predetermined measuring stage. In this case, the sample cell 100 is placed in a thermostatic chamber 115 with a heater 116 so that a mixed solution W including the sample S and the reagent R is placed under a certain thermostatic environment (for example, 37° C.), to thereby keep measuring conditions constant.

In addition, there is illustrated a stirring drive device 120 provided outside the sample cell 100, which is configured to drive a magnetic stirrer bar 121 in the sample cell 100 in order to stir the mixed solution W in the sample cell 100. For example, the stirring drive device 120 is configured to inhibit gelation of the mixed solution W as a whole while giving a certain stirring state to the mixed solution W to uniformly stir the mixed solution W.

In particular, in this example, the stirring drive device 120 is constructed as a stirring drive source (electro magnetic stirrer) configured to cause the stirrer bar 121 formed of, a magnetic material, which is built in a bottom wall in the sample cell 100, to exhibit a stirring force generated by a magnetic force.

Further, an optical system 130 configured to measure a gelation reaction in the mixed solution W in the sample cell 100 is arranged on the periphery of the sample cell 100.

<Configuration Example of Sample Cell>

Next, detailed description is given to a configuration example of the sample cell 100 to be used in this embodiment and an introduction example of the stirrer bar 121 and the sample S into the sample cell 100 with reference to FIG. 7A and FIG. 7B.

In FIG. 7A and FIG. 7B, the sample cell 100 is formed of, for example, a bottomed tubular container 101 having a circular shape in transverse cross section, which is integrally formed of a glass material, with an upper portion being opened. A flange portion 102 is formed in an upper part of the tubular container 101, and a constricted portion 103 is formed in a lower part of the flange portion 102. A small-diameter hole 104 is formed in the flange portion 102 and the constricted portion 103, and a large-diameter space portion 105 having a diameter larger than that of the small-diameter hole 104 is formed in the tubular container 101.

The sample S containing an endotoxin and a reagent 106 causing a gelation reaction are accommodated in advance in the sample cell 100, for example, in the form of frozen dry powder under an endotoxin-free and pyrogen-free state, and the magnetic stirrer bar 121 using a magnetic material is accommodated in the sample cell 100 in advance.

Further, a sealing stopper 108 made of an elastic material, for example, a rubber is fitted in the small-diameter hole 104 of the sample cell 100. The sealing stopper 108 is formed into a substantially T shape in cross section. A head portion 108a of the sealing stopper 108 is mounted on the flange portion 102 of the sample cell 100, and a leg portion 108b of the sealing stopper 108 is inserted in the small-diameter hole 104 under a state of being brought into close contact therewith. A notch 108c is formed in a part of the leg portion 108b of the sealing stopper 108.

Further, the flange portion 102 of the sample cell 100 and the head portion 108a of the sealing stopper 108 are covered with, for example, a cap-shaped holding cover 109 made of aluminum. The holding cover 109 is fitted on a peripheral wall of the flange portion 102 of the sample cell 100 so as to cover and hold the sealing stopper 108 from outside. A hole 109a is formed, for example, at the center of the holding cover 109 so as to face the head portion 108a of the sealing stopper 108.

In addition, as illustrated in FIG. 7A and FIG. 7B, the sample cell 100 accommodates the reagent 106 and the stirrer bar 121 under a state in which the small-diameter hole 104 of the tubular container 101 is opened. In this state, the small-diameter hole 104 of the tubular container 101 is sealed with the sealing stopper 108, and the sealing stopper 108 is covered with the holding cover 109.

The sample cell 100 in the above-mentioned state is supplied to a user as an accessory or a measuring kit of the gel particle measuring apparatus.

As the introduction example of the sample S into the tubular container 101 of the sample cell 100 in this mode, there is given, for example, an introduction procedure involving perforating the sealing stopper 108 with a perforating member (not shown), such as an injection needle, through use of the hole 109a of the holding cover 109 and injecting the sample S with an injector (not shown) through the perforated hole. Further, in order to facilitate the introduction of the sample S, the sealing specifications of the sealing stopper 108 may be set so that a predetermined negative pressure level is kept with respect to an atmospheric pressure in the tubular container 101.

<Entire Configuration of Optical System>

In this example, as illustrated in FIG. 5, the optical system 130 includes a laser light source 131 configured to emit coherent irradiation light Bm. The irradiation light Bm from the laser light source 131 is collimated through a collimator lens 132, and the direction of an optical axis m of the irradiation light Bm from the laser light source 131 is converted by about 90° through a prism-type mirror 133. With this, the irradiation light Bm from the laser light source 131 is guided to the sample cell 100. In an irradiation light path AT between the prism-type mirror 133 and the sample cell 100, a pinhole 134 (hole diameter d1: for example, 2 mm) serving as a diaphragm member is arranged immediately after the prism-type mirror 133. The irradiation light Bm narrowed down by the pinhole 134 is converged to a predetermined region of the sample cell 100 through an imaging lens 135.

In addition, the optical system 130 includes a backscattered light detector 140, which is arranged outside the sample cell 100 and on the same side as the laser light source 131. When the irradiation light Bm from the laser light source 131 enters the sample cell 100, the backscattered light detector 140 detects, out of light scattered from gel particles G produced in the mixed solution W in the sample cell 100, a backscattered light component returning toward the irradiation light path AT from the laser light source 131. In, the irradiation light path AT from the laser light source 131, a reflection mirror 141 is arranged between the pinhole 134 and the imaging lens 135. The backscattered light traveling from the sample cell 100 toward the backscattered light detector 140 is reflected so as to have the optical axis m converted by about 90° through the reflection mirror 141 and converged to a predetermined region of the backscattered light detector 140 through an imaging lens 142.

Here, a hole 141a (hole diameter d2>d1: for example, 5 mm) through which the irradiation light Bm narrowed down by the pinhole 134 directly passes is formed in advance in the reflection mirror 141. In addition, the backscattered light from the sample cell 100 is transmitted through the imaging lens 135 while being diffused from an incident focus position to the periphery to become substantially parallel light, to thereby reach the reflection mirror 141. A light beam of backscattered light $Bm_2$ reaching the reflection mirror 141 is sufficiently wider than the hole diameter d2 of the hole 141a of the reflection mirror 141, and hence an attenuation amount of the backscattered light $Bm_2$ in the hole 141a of the reflection mirror 141 is significantly low.

<Light Path Adjusting Procedure 1>

Figure 8A:
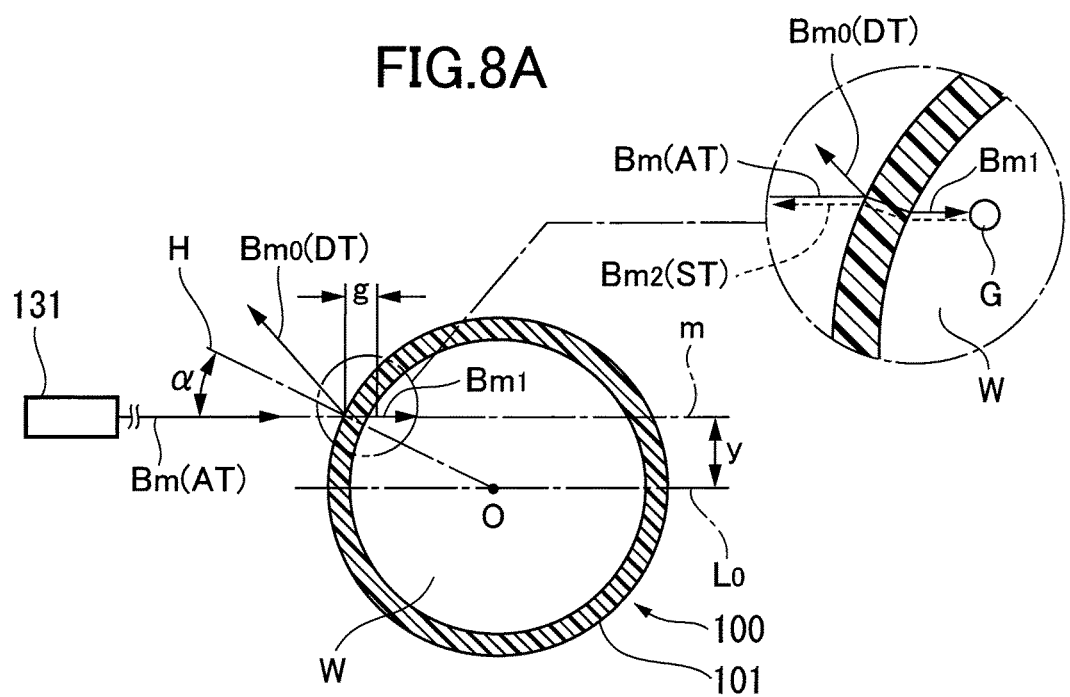
FIG. 8A is an explanatory diagram for illustrating a light path adjusting procedure 1 to be used in the first embodiment.

In this embodiment, as illustrated in FIG. 5 and FIG. 8A, the sample cell 100 includes the tubular container 101 having a circular shape in transverse cross section, and the irradiation light path AT from the laser light source 131 is set so as to pass through a position displaced from a center axis O of the tubular container 101. That is, the irradiation light path AT from the laser light source 131 is displaced by y>0 from an imaginary light path $L_O$, which is parallel to the irradiation light Bm from the laser light source 131, and passes through the center axis O of the tubular container 101. For example, when the tubular container 101 has an outer diameter of 11.8 mm, y is 2.5 mm.

In this case, when the irradiation light Bm from the laser light source 131 enters the tubular container 101 from a direction crossing a normal H direction of a surface of the tubular container 101 at an acute incident angle α on a horizontal surface, a part (transmitted light $Bm_1$) of the irradiation light Bm from the laser light source 131 is refracted to pass through a peripheral wall of the tubular container 101 through an incident portion surface of the tubular container 101 to enter the mixed solution W, and the remaining part (reflection light $Bm_0$) of the irradiation light Bm described above is specularly reflected at substantially the same angle as the incident angle α with the normal H direction interposed therebetween.

Meanwhile, when the irradiation light $Bm_1$ having entered the tubular container 101 impinges on the gel particles G produced in the mixed solution W, the irradiation light $Bm_1$ is scattered as scattered light. Out of the scattered light, the backscattered light $Bm_2$ component traveling toward the backscattered light detector 140 is refracted to pass through the peripheral wall of the tubular container 101 through substantially the same light path as that of the incident light $Bm_1$ and returns toward, a detection light path ST including the same light path as the irradiation light path AT.

In this state, the reflection light $Bm_0$ radiated, from the laser light source 131 and reflected from the surface of the tubular container 101 travels toward a reflection light path DT in a direction different from the detection light path ST toward the backscattered light detector 140, and hence there is no risk in that the reflection light $Bm_0$ is mixed into the detection light path ST.

Here, an angle (2α) between the detection light path ST and the reflection light path DT may be appropriately selected depending on a displacement amount y of the irradiation light path AT from the laser light source 131 in consideration of the outer diameter, thickness, and material of the tubular container 101.

<Light Path Adjusting Procedure 2>

Figure 8B:
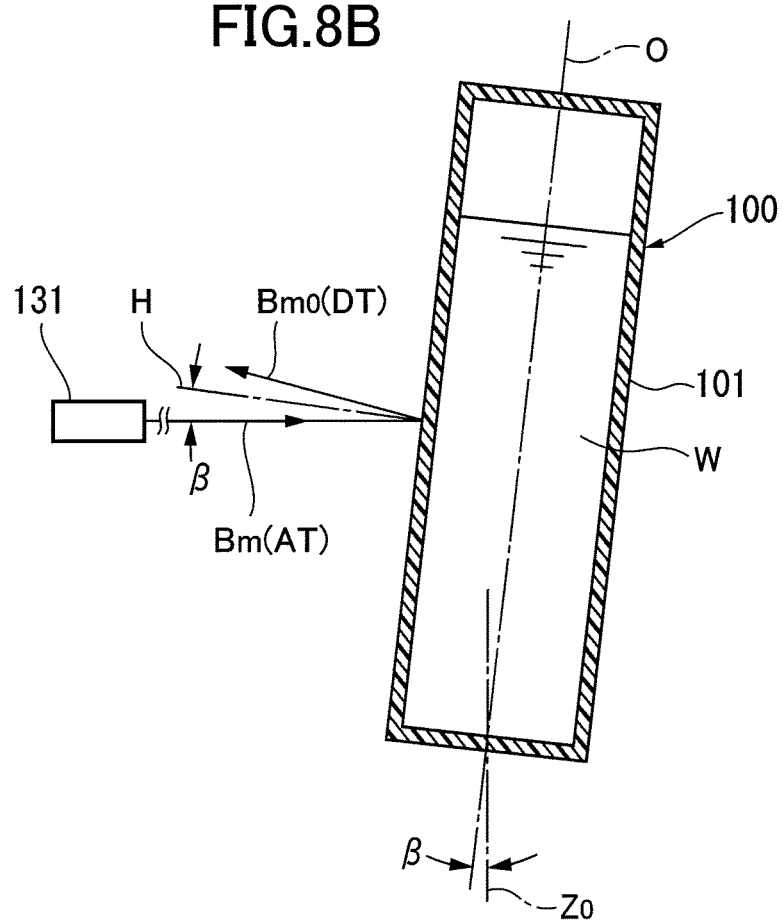
FIG. 8B is an explanatory diagram for illustrating a light path adjusting procedure 2 to be used in the first embodiment.

In this embodiment, as illustrated in FIG. 6 and FIG. 8B, the sample cell 100 is held by a cell holder 110. In this example, the cell holder 110 includes a support column 111 extending in a vertical direction and a holder arm 112 in which a holding portion capable of holding the sample cell 100 is formed in advance. The holder arm 112 is swingably supported on the support column 111 through intermediation of a swinging shaft 113 having a horizontal direction crossing the support column ill as a swinging fulcrum, and the sample cell 100 is held by the holding portion of the holder arm 112. After that, the holder arm 112 is appropriately swung about the swinging shaft 113, and the holder arm 112 is fixed to a predetermined swinging position with a stopper (not shown) formed coaxially with the swinging shaft 113.

Through use of the cell holder 110, the sample cell 100 is arranged under a state in which the center axis O of the tubular container 101 is inclined by an inclination angle β with respect to a vertical axis $Z_0$ by fixing the holder arm 112 at the predetermined swinging position.

In this case, the irradiation light Bm from the laser light source 131 is radiated from a substantially horizontal direction and enters the sample cell 100 while being inclined by an incident angle β with respect to the normal H direction of the surface of the peripheral wall of the sample cell 100 in a vertical direction. Therefore, the irradiation light Bm is specularly reflected at substantially the same angle as the incident angle β with the normal H direction interposed therebetween.

In this state, the reflection light $Bm_0$ radiated from the laser light source 131 and reflected from the surface of the sample cell 100 (tubular container 101) travels toward the reflection light path DT having an angle of 2β in the vertical direction with respect to the horizontal surface. Therefore, there is no risk in that the reflection light $Bm_0$ is mixed into the detection light path ST toward the backscattered light detector 140.

Here, the inclination angle β of the sample cell 100 may be appropriately selected depending on a support structure and the like of the sample cell 100 from the viewpoint of accurately separating the reflection light path DT and the detection light path ST from each other.

In this embodiment, the cell holder 110 uses the swingable holder arm 112, but the present invention is not limited thereto. For example, through provision of an accommodating portion of the sample cell 100 and a light path leading to the laser light source 131 or the backscattered light detector 140 to a heating block with a heater forming the thermostatic chamber 115, the heating block itself may be used as the cell holder.

<Focus Point Adjusting Procedure>

In this embodiment, adjustment of each focus point of the imaging lenses 135 and 142 used in the optical system 130 is set as follows.

The imaging lens 135 is configured to cause the irradiation light Bm from the laser light source 131 to be converged with a position immediately after the irradiation light Bm has passed through the peripheral wall of the sample cell 100 being an incident focus position $Q_1$. Here, when a distance between the incident focus position $Q_1$ and a peripheral wall surface position of the sample cell 100 which the irradiation light Bm enters is represented by g (see FIG. 8A), the distance g may be appropriately selected under conditions of being larger than the thickness of the peripheral wall of the sample cell 100 and being close to an inner wall surface of the sample cell 100. For example, in the case of the sample cell 100 having an outer diameter of 11.8 mm and a thickness of 0.7 mm, the distance g may be selected within a range of from 1.0 mm to 2.5 mm. The detail is described later in Example 2.

In addition, the imaging lens 142 is configured to cause the backscattered light $Bm_2$ traveling toward the backscattered light detector 140 to be converged with a detection surface of the backscattered light detector 140 being a conjugate focus position $Q_2$.

<Data Analysis Device>

Figure 9:
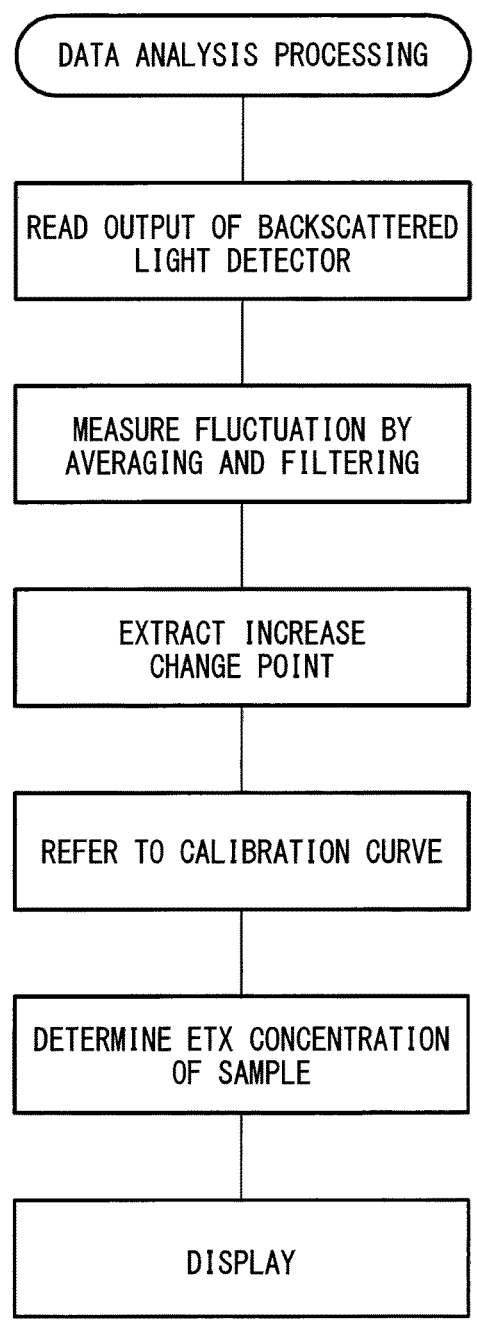
FIG. 9 is a flowchart for illustrating one example of data analysis processing by the gel particle measuring apparatus according to the first embodiment.

In FIG. 5 and FIG. 6, there is illustrated a data analysis device 160 configured to take in a detection output from the backscattered light detector 140 to execute data analysis processing, for example, as illustrated in FIG. 9, and there is also illustrated a display 170 configured to display analysis results obtained by analysis in the data analysis device 160.

The data analysis device 160 is formed of a computer system including a CPU, a ROM, a RAM, an I/O interface, and the like. A data analysis processing program illustrated in FIG. 9 is stored in advance in, for example, the ROM, and the data analysis processing program is executed by the CPU based on the detection output from the backscattered light detector 140.

For example, the detection output from the backscattered light detector 140 is subjected to current-voltage conversion by an amplifier (not shown), and subjected to AD conversion by an AD converter, thereby being taken into the data analysis device 160.

Next, an operation of the gel particle measuring apparatus according to this embodiment is described.

In this embodiment, as illustrated in FIG. 5 and FIG. 6, when the sample S containing an endotoxin is injected to the sample cell 100 accommodating the reagent R in advance, and a start switch (not shown) is turned on, a measuring sequence by the gel particle measuring apparatus is started.

In the measuring sequence, the magnetic stirrer bar 121 is rotated in the stirring drive device 120, and the mixed solution W including the sample S and the reagent R in the sample cell 100 is stirred. Therefore, the mixed solution W as a whole is uniformly stirred, and gelation of the mixed solution W as a whole is inhibited.

Further, in the measuring sequence, the coherent irradiation light Bm is radiated from the laser light source 131 to the mixed solution W in the sample cell 100. Out of light scattered in the mixed solution W, a backscattered light component traveling toward the laser light source 131 is detected by the backscattered light detector 140, and the detection output of the backscattered light detector 140 is taken into the data analysis device 160.

In this case, as illustrated in FIG. 5 and FIG. 8A, the irradiation light Bm from the laser light source 131 has an optical axis converted toward the sample cell 100 after having passed through the collimator lens 132 and the prism-type mirror 133. After that, the irradiation light Bm is narrowed down to a light beam having an outer diameter corresponding to the hole diameter d1 (in this example, d1=2 mm) of the pinhole 134 and directly passes through the hole 141a (hole diameter d2>d1: in this example, d2=5 mm) of the reflection mirror 141 to enter the sample cell 100 with the incident focus position $Q_1$ of the sample cell 100, which is determined by the imaging lens 135 in advance, being a convergence point.

Here, additional description is given to the situation in which the irradiation light Bm from the laser light source 131 enters the incident portion of the sample cell 100. As illustrated in FIG. 8A, the irradiation light Bm is separated into the reflection light $Bm_0$ from the surface of the peripheral wall of the sample cell 100 and the transmitted light $Bm_1$ which is refracted to enter the peripheral wall of the sample cell 100 to enter the mixed solution W in the sample cell 100. There is also a light component that is partially scattered from the surface of the peripheral wall of the sample cell 100.

When the gel particles G are produced in the mixed solution W in the sample cell 100 in this state, the transmitted light $Bm_1$ impinges on the gel particles G to be scattered. Out of the scattered light, the backscattered light $Bm_2$ component returns to the incident portion side of the peripheral wall of the sample cell 100 and is mainly output to the detection light path ST that is present in the same region as that of the irradiation light path AT through the same pathway as the incident pathway of the transmitted light $Bm_1$.

Meanwhile, as illustrated in FIG. 8A and FIG. 8B, the reflection light $Bm_0$ from the surface of the peripheral wall of the sample cell 100 is reflected along the reflection light path DT. The reflection light path DT has an angle of $2\alpha$ with respect to the detection light path ST in the horizontal surface, and further has an angle of $2\beta$ with respect to the detection light path ST in the vertical surface. Therefore, the direction of the reflection light path DT is completely different from that of the detection light path ST (in this example, including the same pathway as that of the irradiation light path AT). As a result, there is no risk in that the reflection light $Bm_0$ component reflected from the surface of the peripheral wall of the sample cell 100 is mixed so as to be integrated with the backscattered light $Bm_2$ component traveling toward the detection light path ST.

As described above, the backscattered light $Bm_2$ from the gel particles G travels toward the backscattered light detector 140 through the detection light path ST. When it is assumed that the gel particles G are produced at the incident focus position $Q_1$ of the imaging lens 135 or in the vicinity thereof, the backscattered light $Bm_2$ output from the sample cell 100 is diffused and radiated with the gel particles G being start points and becomes a light beam wider than a light beam of the irradiation light Bm from the laser light source 131 to reach the imaging lens 135. Then, the backscattered light $Bm_2$ having reached the imaging lens 135 passes through the imaging lens 135 to change to a substantially parallel light beam having an outer diameter d3 (d3>>d1) substantially corresponding to an aperture of the imaging lens 135. After that, the resultant backscattered light $Bm_2$ reaches the reflection mirror 141 and has an optical axis converted by about 90° by the reflection mirror 141 to travel toward the backscattered light detector 140.

The detection light path ST of the backscattered light $Bm_2$ is separated from the middle of the irradiation light path AT of the irradiation light Bm in this state. Therefore, the backscattered light detector 140 can be set at a position that is not related to the laser light source 131 or the optical components (the collimator lens 132 or the prism-type mirror 133) arranged on the laser light source 131 side with respect to the reflection mirror 141. The reflection mirror 141 has the hole 141a, and hence a part of the backscattered light $Bm_2$ is lost through the hole 141a. However, the reflection surface of the reflection mirror 141 from which the backscattered light $Bm_2$ is reflected is sufficiently wider than the hole 141a, and hence a loss amount of the backscattered light $Bm_2$ is extremely small.

After that, the backscattered light $Bm_2$ reflected from the reflection mirror 141 reaches the imaging lens 142 and is converged by the imaging lens 142 with the detection surface of the backscattered light detector 140 being the conjugate focus position $Q_2$. Therefore, the backscattered light $Bm_2$ from the gel particles G positioned at the incident focus position $Q_1$ or in the vicinity thereof forms an image under a state of being focused on the detection surface of the backscattered light detector 140.

Figure 10A:
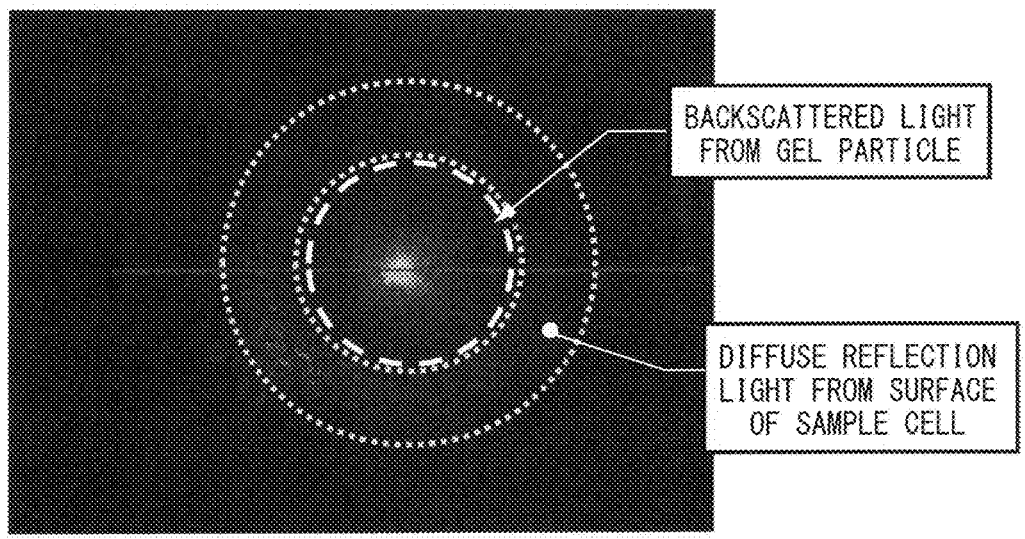
FIG. 10A is an image for showing an output example of a backscattered light detector to be used in the first embodiment.

Now, an output example of the backscattered light detector 140 is shown in FIG. 10A.

In FIG. 10A, the backscattered light $Bm_2$ from the gel particles G is output under a state of being focused on a substantially central position of the detection surface of the backscattered light detector 140. In addition, there is a possibility that an extremely small part of diffuse reflection light from the surface of the sample cell 100 may be mixed into the detection light path ST. However, the surface of the sample cell 100 is separated from the incident focus position $Q_1$ of the imaging lens 135 by the distance g, and hence the diffuse reflection light $Bm_2'$ component from the surface of the sample cell 100 is output under a state of not being focused to a portion away from the backscattered light $Bm_2$ from the gel particles G on the detection surface of the backscattered light detector 140.

Figure 10B:
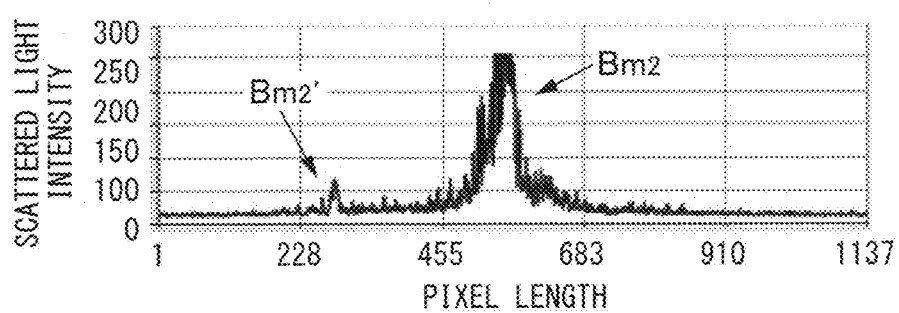
FIG. 10B is a graph for showing one example of a scattered light intensity distribution of the output example shown in FIG. 10A.

In addition, a scattered light intensity distribution was measured regarding the output example shown in FIG. 10A, and results shown in FIG. 10B were obtained. According to the results shown in FIG. 10B, the backscattered light $Bm_2$ component from the gel particles G exhibits an intensity higher than that of the diffuse reflection light $Bm_2'$ component from the surface of the sample cell 100, and hence, even when the diffuse reflection light $Bm_2'$ component from the surface of the sample cell 100 is mixed into the backscattered light $Bm_2$, t is possible to detect the backscattered light $Bm_2$ from the gel particles G while excluding the diffuse reflection light $Bm_2'$ component.

Meanwhile, in the mixed solution W in the sample cell 100, stimulation with the endotoxin is delivered to the *limulus* reagent to cause a *limulus* reaction as illustrated in FIG. 3, and the gel particles G are sequentially produced under a state in which gelation of the mixed solution W as a whole is inhibited.

In this embodiment, for example, when one gel particle G is produced in a passage area of the coherent irradiation light Bm from the laser light source 131, this production is grasped as a production start time point of the gel particle G leading to timing of a phase change point at which the mixed solution W changes from a sol phase to a gel phase.

In the above-mentioned reaction process, for example, as illustrated in FIG. 9, the data analysis device 160 reads the detection output from the backscattered light detector 140 as scattered light amount data (digital data), and then measures a fluctuation component of the scattered light amount data by averaging and filtering processing.

Then, an increase change point (corresponding to $P_2$ of Step II in FIG. 2C) of the scattered light amount data detected by the backscattered light detector 140 is extracted based on the fluctuation component of the scattered light amount data, and an endotoxin concentration (ETX concentration) of the sample S is determined with reference to a calibration curve defined in advance to be displayed on the display 170.

In this example, the calibration curve represents a relationship between the endotoxin concentration (ETX concentration) and the time threshold until the increase change point of the scattered light amount data, and the endotoxin concentration (ETX concentration) is determined based on the correlation between the time required for reaching the increase change point of the scattered light amount data and the calibration curve. In addition, besides the endotoxin concentration (ETX concentration), data such as time-series data of the scattered light amount data and time-series measurement data of the fluctuation component of the scattered light amount data are displayed on the display 170 in a switchable manner.

<Preparation Example of Calibration Curve>

Now, a preparation example of a calibration curve adopted in this embodiment is described.

Experimental conditions determined in advance are set, for example, as follows, and a change in scattered light intensity (scattered light amount data) obtained by the backscattered light detector 140 is investigated for each of *limulus* reagents, to which samples having various endotoxin concentrations (for example, 10 pg/ml, 1 pg/ml, and 0.1 pg/ml) are added, through use of the gel particle measuring apparatus according the first embodiment.

The experimental conditions used in this example are as follows.

Laser light source 131: red light or blue light
Backscattered light detector 140: photodiode
Number of rotations of stirrer bar 121: 1,000 rpm
Thermostatic condition: 37° C.

Figure 11A:
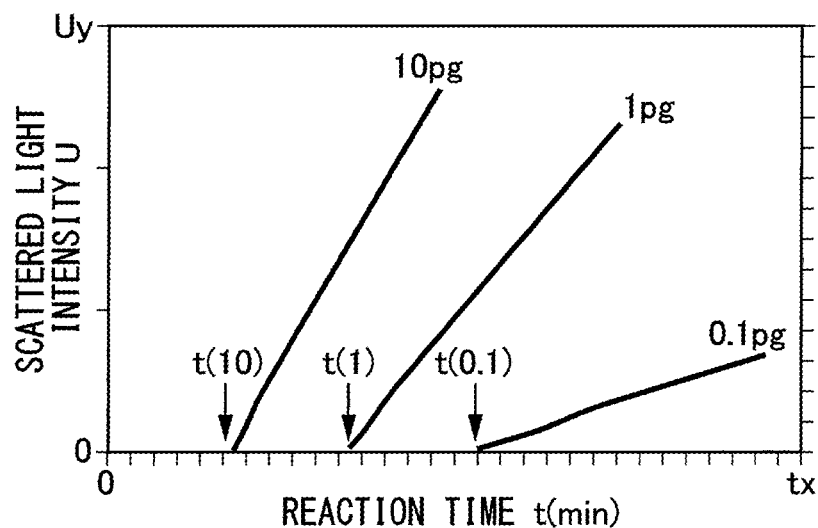
FIG. 11A is a graph for showing a detection example of the gel particle by backscattered light measurement with respect to a sample having a known endotoxin concentration.

FIG. 11A is a graph prepared by plotting the values of the scattered light intensity with the passage of time for samples having endotoxin concentrations of 10 pg/ml, 1 pg/ml, and 0.1 pg/ml. The ordinate of FIG. 11A represents a scattered light intensity U (maximum scattered light intensity scale in the graph is represented by Uy), and the abscissa represents a reaction time (maximum reaction time scale in the graph is represented by tx (for example, 100 min)).

In FIG. 11A, any of the changes in scattered light intensity for respective conditions shows the tendency that the portion keeping a constant level of nearly zero increases after a certain time elapses. The increase change point of each of the scattered light intensities corresponds to the production start time point of the gel particles G (timing at which the sample containing an endotoxin changes in phase from a sol phase to a gel phase), and is estimated to mean the increase in light at the gelation start time.

In order to determine the gelation start time, in this embodiment, in the graph of FIG. 11A, the intersection point between a straight line (in general, 0) obtained by approximating the portion in which the scattered light intensity was constant and a straight line obtained by approximating the change portion in which the scattered light intensity was inclined to increase was manually determined, to thereby determine each of the gelation start times (reaction times) t(10), t(1), and t(0.1).

Figure 11B:
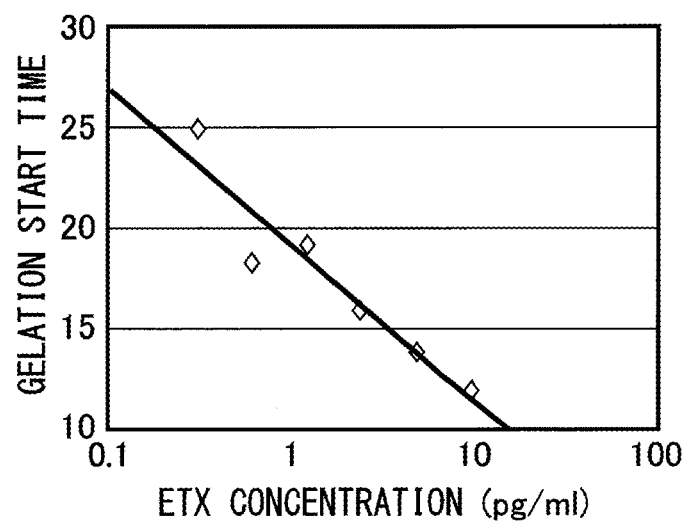
FIG. 11B is a graph for showing a calibration curve preparation example using results shown in FIG. 11A.

Further, in this embodiment, a calibration curve was prepared through use of the values of the gelation start times t(10), t(1), and t(0.1) determined from the graph of FIG. 11A (see FIG. 11B).

In FIG. 11E, the calibration curve is prepared by plotting the values of the gelation start times with the X-axis being the ETX concentration (logarithmically converted), which is the endotoxin concentration, and the Y-axis being the gelation start time, and drawing a straight line by a least squares method with respect to those values. In this case, a linear relationship is obtained in the values of the gelation start times with respect to the samples having the respective endotoxin concentrations, and a correlation with a high correlation coefficient is exhibited.

In this embodiment, the sample cell 100 itself or the periphery of the sample cell 100 is not separately elaborated, but the present invention is not limited thereto. Configurations according to first and second modified embodiments described below may be adopted.

First and Second Modified Embodiments

In the first and second modified embodiments, the sample cell 100 includes a stray light removing member 150 configured to remove a stray light component generated by one of transmission and scattering on an inner wall of the sample cell 100 other than the backscattered light $Bm_2$ component traveling toward the backscattered light detector 140 in the mixed solution W.

Figure 12A:
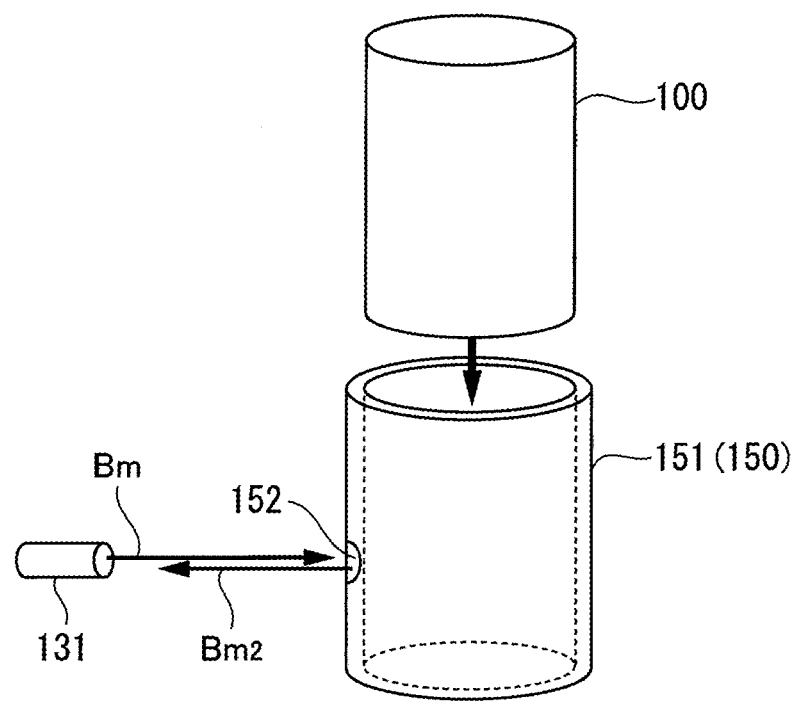
FIG. 12A is an explanatory diagram for illustrating a first modified embodiment of the gel particle measuring apparatus according to the first embodiment.

In the first modified embodiment, for example, as illustrated in FIG. 12A, the stray light removing member 150 has a configuration in which a tubular cover 151 is set so as to surround the periphery of the sample cell 100, an inner surface of the tubular cover 151 is covered with, for example, a black light absorbing material, and a through hole 152 for causing the irradiation light Bm from the laser light source 131 and the backscattered light $Bm_2$ traveling toward the backscattered light detector 140 to pass therethrough is formed in a part of the tubular cover 151.

In this modified embodiment, the sample cell 100 is formed of a transmissive material. However, transmission of light in the mixed solution W in the sample cell 100 is hardly required. Therefore, only one portion of the sample cell 100, corresponding to a position for transmitting the irradiation light Bm from the laser light source 131 and the backscattered light $Bm_2$ traveling toward the backscattered light detector 140, may be formed as a transmissive incident portion, and the other portions of the sample cell 100 may be formed of a non-transmissive material or coated with a non-transmissive paint.

Figure 12B:
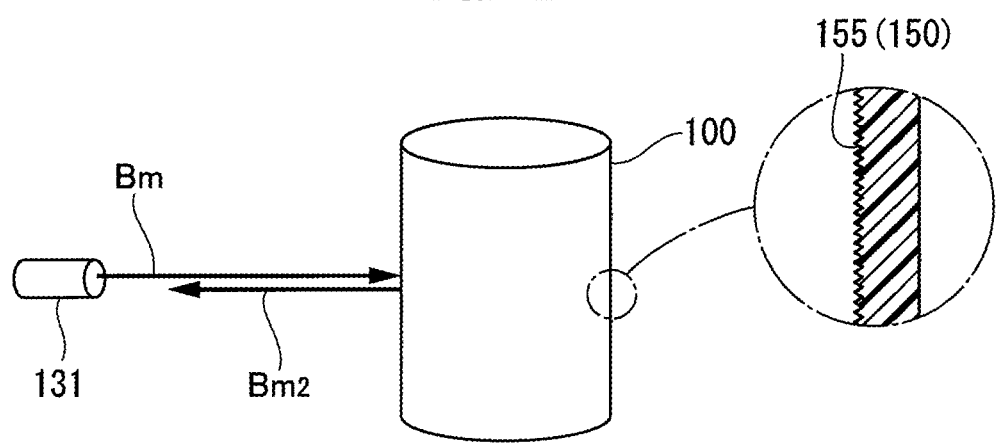
FIG. 12B is an explanatory diagram for illustrating a second modified embodiment of, the gel particle measuring apparatus according to the first embodiment.

Further, in the second modified embodiment, the stray light removing member 150 is not limited to a mode in which the stray light removing member 150 is arranged outside the sample cell 100. For example, as illustrated in FIG. 12B, a minute rough surface 155 may be formed as the stray light removing member 150 on an inner wall peripheral surface of the sample cell 100 so that a stray light component of the irradiation light Bm radiated from the laser light source 131 is diffusely reflected from the minute rough surface 155 to be attenuated.

In those modified embodiments, the stray light removing member 150 is arranged, but it is not necessarily required to use the stray light removing member 150. For example, the degree to which a stray light component has an effect may be actually measured in advance through use of a sample having a known endotoxin concentration, and based on this actually measured value, for example, a stray light component actually measured based on the detection output of the backscattered light detector 140 may be corrected.

Third and Fourth Modified Embodiments

In the third and fourth modified embodiments, the light path adjusting procedures 1 and 2 are adopted for adjustment of the incident portion surface of the sample cell 100. However, the present invention is not limited thereto, and a light path adjusting procedure 3 according to the third and fourth modified embodiments described below may be adopted.

Figure 13A:
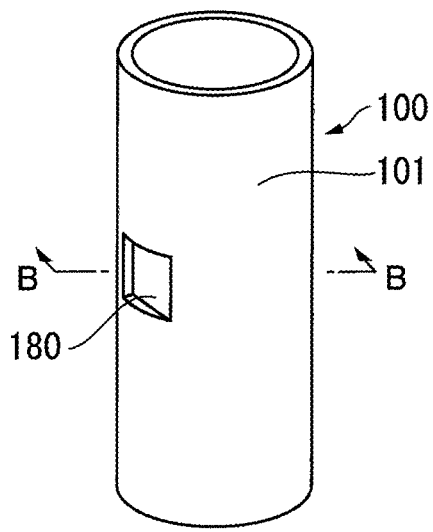
FIG. 13A is an explanatory diagram for illustrating a third modified embodiment of the gel particle measuring apparatus according to the first embodiment.
Figure 13C:
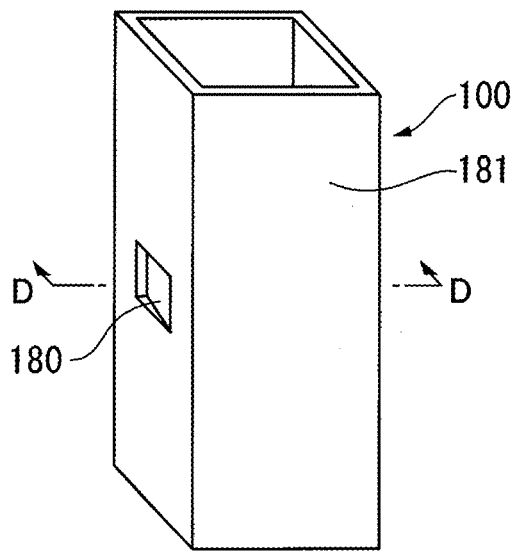
FIG. 13C is an explanatory diagram for illustrating a fourth modified embodiment of the gel particle measuring apparatus according to the first embodiment.
Figure 13B:
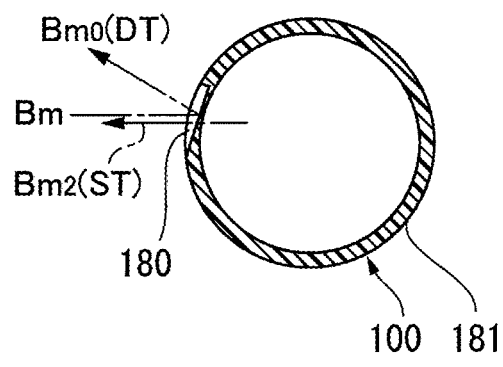
FIG. 13B is a sectional diagram taken along the line B-B of FIG. 13A.

First, in the third modified embodiment, as illustrated in FIG. 13A and FIG. 13B, for example, in a mode in which the sample cell 100 includes the tubular container 101 having a circular shape in cross section, the third light path adjusting procedure 3 may involve forming a reflection surface 180 in advance in the incident portion through which the irradiation light Bm from the laser light source 131 enters, and making the reflection light path DT of the reflection light $Bm_0$ reflected from the reflection surface 180 different from the detection light path ST of the backscattered light $Bm_2$ traveling toward the backscattered light detector 140. Here, it is only required that the angle of the reflection surface 180 be selected so that the reflection light $Bm_0$ reflected to the reflection light path DT is not mixed into the detection light path ST.

In this example, needless to say, the light path adjusting procedure 1 or 2 may be appropriately combined with the light path adjusting procedure 3.

Figure 13D:
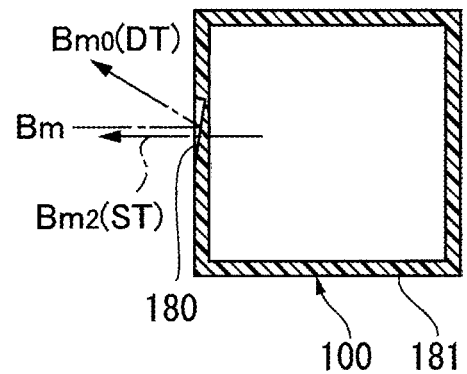
FIG. 13D is a sectional diagram taken along the line D-D of FIG. 13C.

In addition, in the fourth modified embodiment, for example, as illustrated in FIG. 13C and FIG. 13D, in a mode in which the sample cell 100 includes a tubular container 181 having a rectangular shape in cross section, the light path adjusting procedure 3 may involve forming the reflection surface 180 in advance in the incident portion through which the irradiation light Bm from the laser light source 131 enters, and making the reflection light path DT of the reflection light $Bm_0$ reflected from the reflection surface 180 different from the detection light path ST of the backscattered light $Bm_2$ traveling toward the backscattered light detector 140.

In this example, the light path adjusting procedure 2 may be combined with the light path adjusting procedure 3.

Second Embodiment

FIG. 14 is a diagram for illustrating an entire configuration of the gel particle measuring apparatus according to a second embodiment.

In FIG. 14, a basic configuration of the gel particle measuring apparatus is substantially the same as that of the first embodiment but includes an optical system 130 different from that of the first embodiment. The same components as those of the first embodiment are denoted by the same reference symbols as those of the first embodiment, and detailed description thereof is omitted here.

In this embodiment, the gel particle measuring apparatus includes the sample cell 100 and the stirring drive device 120 that are the same as those of the first embodiment.

Further, in the same manner as in the first embodiment, the optical system 130 includes the laser light source 131, the collimator lens 132, the prism-type mirror 133, the pinhole 134, the imaging lens 135, the backscattered light detector 140, and the reflection mirror 141 (including the hole 141a). However, unlike the first embodiment, a plurality of (three in this example) imaging lenses 144 to 146 are arranged in the detection light path ST between the reflection mirror 141 and the backscattered light detector 140, and a pinhole 147 having a hole diameter d4 is arranged between the first imaging lens 144 and the second imaging lens 145.

Then, in this example, the pinhole 147 having the hole diameter d4 (see FIG. 15A) of, for example, 1 mm or less, preferably 0.5 mm or less, which is a sufficiently small value, is used.

The first imaging lens 144 is configured to cause the backscattered light $Bm_2$ reflected from the reflection mirror 141 to be converged with the position of the pinhole 147 (corresponding to the position of an optical axis of the pinhole 147) being a conjugate focus position $Q_{21}$.

Further, the second imaging lens 145 has a distance from the conjugate focus position $Q_{21}$ as a focal distance and is configured to receive the backscattered light $Bm_2$ having passed through the pinhole 147 to output the backscattered light $Bm_2$ as parallel light.

Further, the third imaging lens 146 is configured to cause the backscattered light $Bm_2$ having passed through the second imaging lens 145 to be converged with the detection surface of the backscattered light detector 140 being a conjugate focus position $Q_{22}$.

In this embodiment, the gel particle measuring apparatus is operated substantially in the same manner as in the first embodiment. The backscattered light $Bm_2$ from the gel particles G in the sample cell 100 becomes parallel light after passing through the imaging lens 135 and has an optical axis converted by the reflection mirror 141 to travel toward the backscattered light detector 140. However, the subsequent operation is different from that of the first embodiment.

Figure 15A:
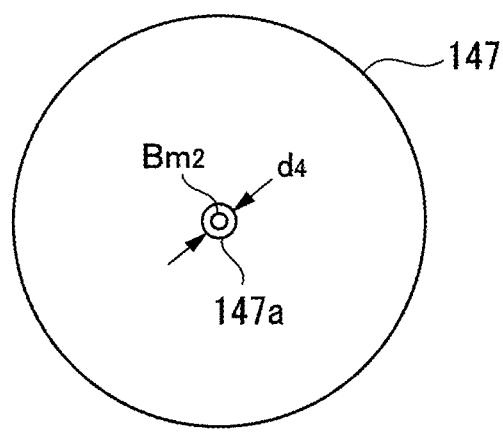
FIG. 15A is an explanatory diagram for illustrating an action of a pinhole to be used in the second embodiment.

That is, the parallel backscattered light $Bm_2$ reflected from the reflection mirror 141 passes through the first imaging lens 144 to be converged with the position of the pinhole 147 being the conjugate focus position $Q_{21}$. In this case, as illustrated in FIG. 15A, the backscattered light $Bm_2$ component from the gel particles G produced at the incident focus position $Q_1$ of the sample cell 100 or in the vicinity thereof once forms an image at a position of a hole 147a (hole diameter d4) of the pinhole 147 and passes through the pinhole 147. However, for example, even when an extremely small part of diffuse reflection light from the surface of the sample cell 100 is mixed into the detection light path ST, the surface of the sample cell 100 and the incident focus position $Q_1$ are separated from each other by the distance g, and hence the diffuse reflection light $Bm_2'$ component from the surface of the sample cell 100 cannot pass through the pinhole 147 and is removed by the pinhole 147.

Figure 15B:
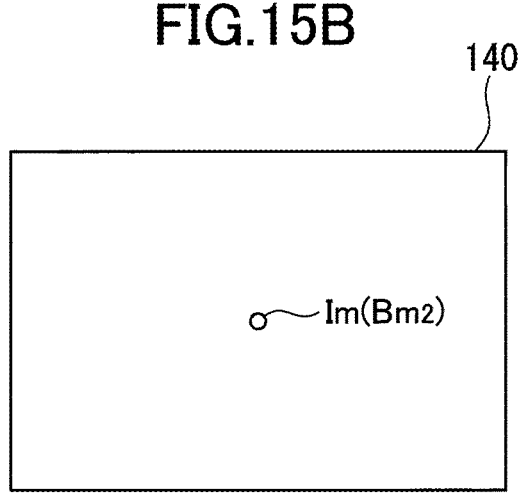
FIG. 15B is an explanatory diagram for illustrating an output example of a backscattered light detector to be used in the second embodiment.

After that, the backscattered light $Bm_2$ component having passed through the pinhole 147 is collimated to become parallel light by the second imaging lens 145 and passes through the third imaging lens 146 to be converged with the detection surface of the backscattered light detector 140 being the conjugate focus position 422. Therefore, the backscattered light $Bm_2$ from the gel particles G positioned at the incident focus position $Q_1$ or in the vicinity thereof forms an image under a state of being focused on the detection surface of the backscattered light detector 140. In this case, as an output example of the backscattered light detector 140, as illustrated in FIG. 15B, the backscattered light $Bm_2$ from the gel particles G is output as an image Im under a state of being focused on the detection surface of the backscattered light detector 140, and the diffuse reflection light $Bm_2'$ component from the surface of the sample cell 100 is removed by the pinhole 147, with the result that the diffuse reflection light $Bm_2'$ component is not output to the detection surface.

Therefore, it is understood that, according to this embodiment, the backscattered light $Bm_2$ from the gel particles G can be detected more accurately as compared to the first embodiment.

Third Embodiment

FIG. 16 is a diagram for illustrating main portions of a gel particle measuring apparatus according to a third embodiment to which the present invention is applied. The same components as those of the first embodiment are denoted by the same reference symbols as those in the first embodiment, and detailed description thereof is omitted. In addition, in FIG. 16, the cell holder 110 and the heater 116 illustrated in FIG. 6 are omitted.

In FIG. 16, the gel particle measuring apparatus includes the sample cell 100, the stirring drive device 120, and the optical system 130 that are substantially the same as those of the first embodiment. However, unlike the first embodiment, a second scattered light detector 190 is set outside the sample cell 100, and for example, on an opposite side to the backscattered light detector (corresponding to the first scattered light detector) 140 with the sample cell 100 interposed therebetween. The detection outputs of the second scattered light detector 190 as well as the first scattered light detector 140 are taken into the date analysis device 160. The production start time point of the gel particles G is determined in the same manner as in the first embodiment based on the detection output of the first scattered light detector 140, and the production state information of the gel particles G (for example, the production amount of the gel particles G) other than the production start time point of the gel particles G is determined based on the detection output (forward scattered light output) of the second scattered light detector 190.

In this example, in the second scattered light detector 190, the scattered light component other than the backscattered light component is detected, and there is a risk in that the second scattered light detector 190 may also detect, for example, a transmitted light component. Therefore, when there is a demand that the transmitted light component be removed as a detection target of the second scattered light detector 190 for data analysis, it is only required that a deflection filter 191 be set so as to remove the transmitted light component through use of phase displacement between the scattered light component and the transmitted light component.

In addition, when the deflection filter 191 is not used, the second scattered light detector 190 detects the scattered light component containing the transmitted light component. In this case, the data analysis device 160 may analyze the scattered light component in consideration of the fact that the scattered light component contains the transmitted light component. Alternatively, the data analysis device 160 may analyze the scattered light component after correcting the scattered light component so that the transmitted light component is removed therefrom.

The second scattered light detector 190 basically detects the scattered light component alone or detects the scattered light component together with the transmitted light component. However, the second scattered light detector 190 is enabled to detect only the transmitted light component free of the scattered light component, for example, by interposing a deflection filter for removing a scattered light component.

In addition, in this example, the production start time point of the gel particles G is determined through use of the detection output of the first scattered light detector 140, and the production state information of the gel particles G other than the production start time point of the gel particles G is determined through use of the detection output of the second scattered light detector 190. However, the present invention is not limited thereto, and the production state information of the gel particles G other than the production start time point of the gel particles G may be determined through use of both the detection outputs of the first scattered light detector 140 and, the second scattered light detector 190. In this case, through use of information on the difference between the detection outputs of the first scattered light detector 140 and the second scattered light detector 190, the properties of a sample solvent can be calibrated based on the degree of attenuation caused by, for example, the non-specific increase in turbidity and generation of stray light derived from scattered light and a sample or the absorption of scattered light derived from a sample solvent, and the production state information on the gel particles G can be more minutely analyzed.

In this embodiment, the second scattered light detector 190 is set on an opposite side of the sample cell 100 to the first scattered light detector 140, but the present invention is not limited thereto. The second scattered light detector 190 may be set at any region as long as the region is different from that of the first scattered light detector 140. For example, when the second scattered light detector 190 is set in a region deflected by 90° in a circumferential direction of the sample cell 100 with respect to the first scattered light detector 140, the side scattered light illustrated in FIG. 4B can be detected.

EXAMPLES

Example 1

In Example 1, a plurality of samples obtained by adding endotoxins each having a known concentration to water or a whole blood solution are prepared, and a relationship between an endotoxin concentration of each of the samples and a measured gelation start time is investigated through use of the gel particle measuring apparatus according to the first embodiment.

In addition, in Comparative Example 1, in order to evaluate performance of Example 1, a relationship between an endotoxin concentration of each of the same samples as those of Example 1 and a measured gelation start time is investigated through use of only the second scattered light detector 190 of the gel particle measuring apparatus according to the third embodiment.

Figure 17:
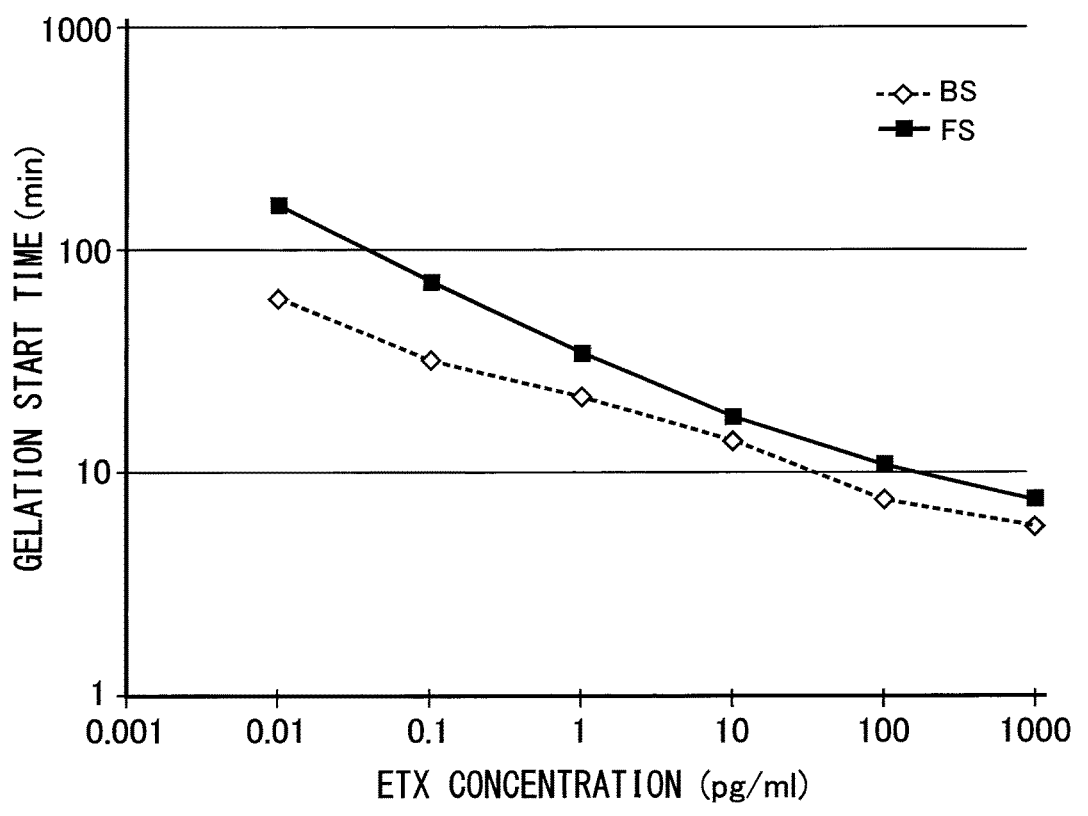

The results are shown in FIG. 17.

BS (backscattering detecting system) represents the results of Example 1, and FS (forward scattering detecting system) represents the results of Comparative Example 1. In FIG. 17, the abscissa represents an endotoxin concentration (ETX concentration) (pg/ml), and the ordinate represents a gelation start time (min).

It is understood from FIG. 17 that superior measurement results are exhibited in Example 1 as compared to those of Comparative Example 1.

In particular, the above-mentioned tendency is conspicuous on a lower concentration side of an endotoxin rather than a higher concentration side of an endotoxin.

The reason for this is considered as follows. As the concentration of an endotoxin becomes lower, the production speed of coagulin decreases, and a time required for forming gel particles becomes long. In addition, the particle growth after the start of gel particle formation is similarly delayed, and hence the time to detection is delayed in a logarithmic change manner.

The following is presumed. In this Example, the backscattering detecting system is adopted, and hence gel particles produced in an extremely early stage are grasped. However, in the forward scattering detecting system in Comparative Example 1, further growth of gel particles is required, which involves a logarithmic reaction change from a size that can be detected by the backscattering detecting system to a size that can be detected by the forward scattering detecting system. Further, the reaction in a low concentration region of an endotoxin is slow. Therefore, the detection of a gelation start time is logarithmically delayed and grasped as a reaction curve parallel to that of the backscattering detecting system in a graph.

For example, when the detection time in Comparative Example 1 and the detection time in Example 1 are actually compared to each other at an endotoxin concentration of around 10 pg/ml, there is a difference of several minutes. However, in an extremely low concentration region of 0.01 pg/ml, the detection time appears under a state of being shortened as a difference of from 60 minutes to 80 minutes in Example 1. Thus, superiority of Example 1 as the gel particle measuring method aiming at prompt measurement is clarified.

Example 2

In Example 2, a positional relationship (distance g) between the incident focus position $Q_1$ of the imaging lens 135 of the optical system 130 illustrated in FIG. 5 and the surface of the sample cell 100 is changed by 0.5 mm, and the detection results of the backscattered light detector 140 in each case are investigated through use of the gel particle measuring apparatus according to the first embodiment.

Test Conditions

Sample cell 100: cylindrical glass tube having an outer diameter of 11.8 mm (thickness: 0.7 mm)

Adjustment amount of incident portion surface of sample cell 100: y=2.5 mm, β=5°

Endotoxin concentration of sample: 10.0 pg/ml

Laser light source 131: irradiation intensity of 10 mW (620 nm)

Pinhole 134: hole diameter of 2 mm

Imaging lens 135: focal length of 30 mm

Reflection mirror 141: hole diameter of 5 mm

Imaging lens 142: focal length of 150 mm

Results are shown in FIG. 18A to FIG. 20B.

Figure 18A:
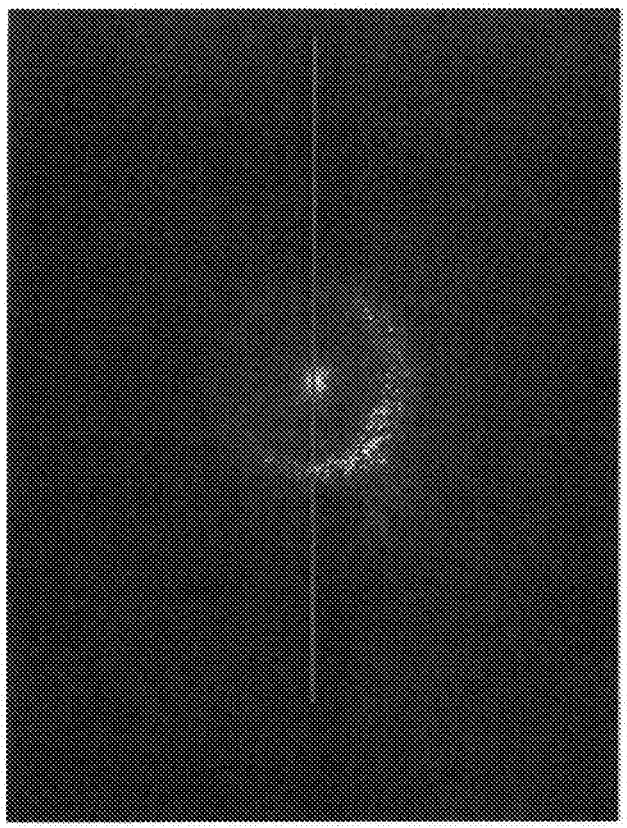
FIG. 18A is an image for showing an output change example I of a backscattered light detector in association with a change in focus position of an optical system of a gel particle measuring apparatus according to Example 2 with respect to a sample cell.
Figure 18B:
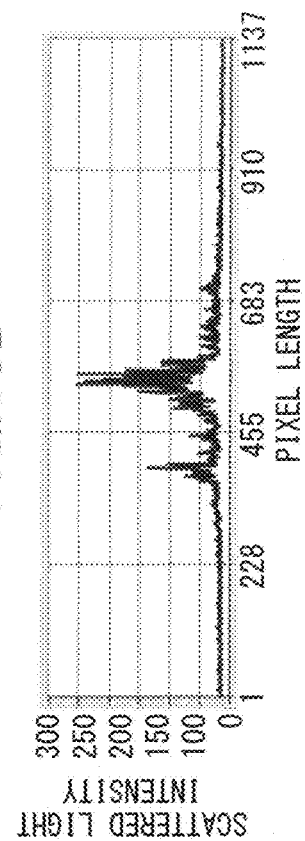
FIG. 18B is a graph for showing a distribution example of a scattered light intensity of FIG. 18A.

FIG. 18A is an image for showing an output example of the backscattered light detector 140 under a condition of g=0 mm, that is, under a condition that the incident focus position $Q_1$ of the imaging lens 135 corresponds to the surface of the sample cell 100, and FIG. 18B is a graph for showing a scattered light intensity distribution thereof.

Figure 18C:
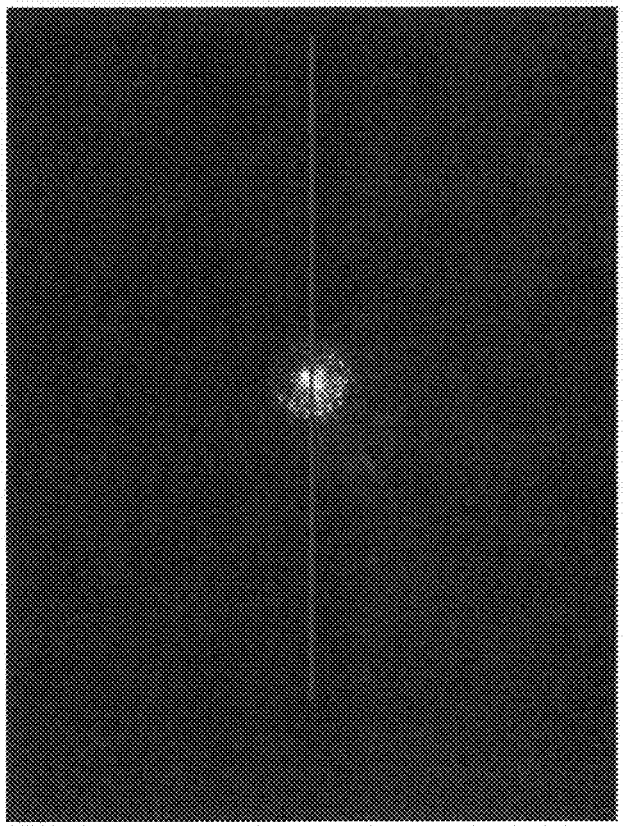
FIG. 18C is an image for showing an output change example II of the backscattered light detector in association with a change in focus position of the optical system of the gel particle measuring apparatus according to Example 2 with respect to the sample cell.
Figure 18D:
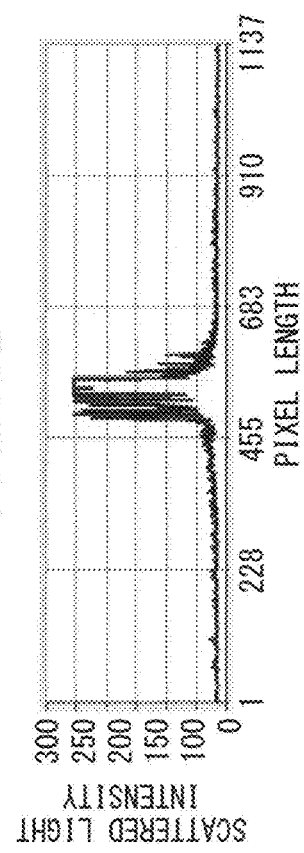
FIG. 18D is a graph for showing a distribution example of a scattered light intensity of FIG. 18C.

FIG. 18C is an image for showing an output example of the backscattered light detector 140 under a condition of g=0.5 mm, and FIG. 18D is a graph for showing a scattered light intensity distribution thereof.

Figure 19C:
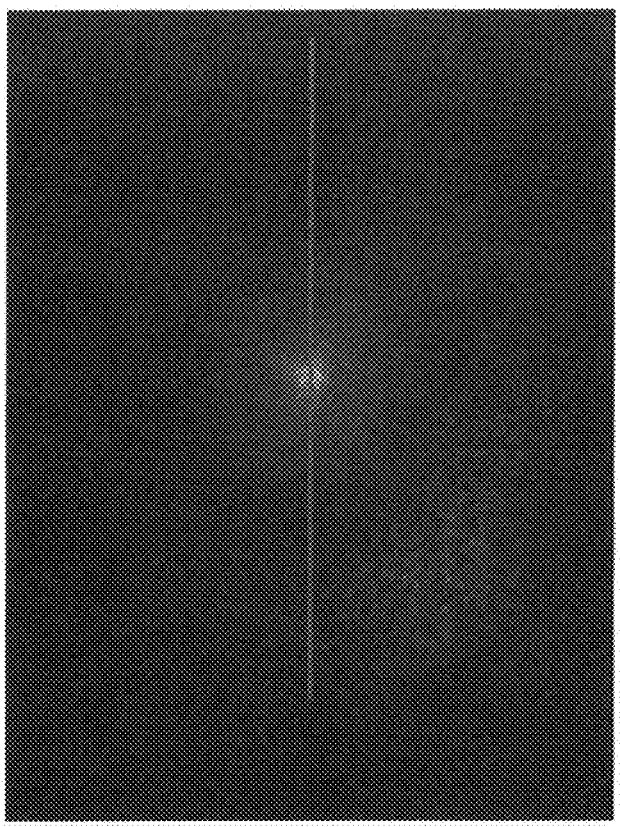
FIG. 19C is an image for showing an output change example IV of the backscattered light detector in association, with a change in focus position of the optical system of the gel particle measuring apparatus according to Example 2 with respect to the sample cell.
Figure 19D:
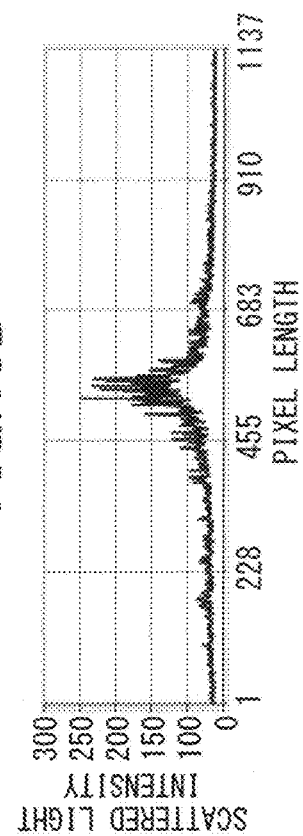
FIG. 19D is a graph for showing a distribution example of a scattered light intensity of FIG. 19C.
Figure 19A:
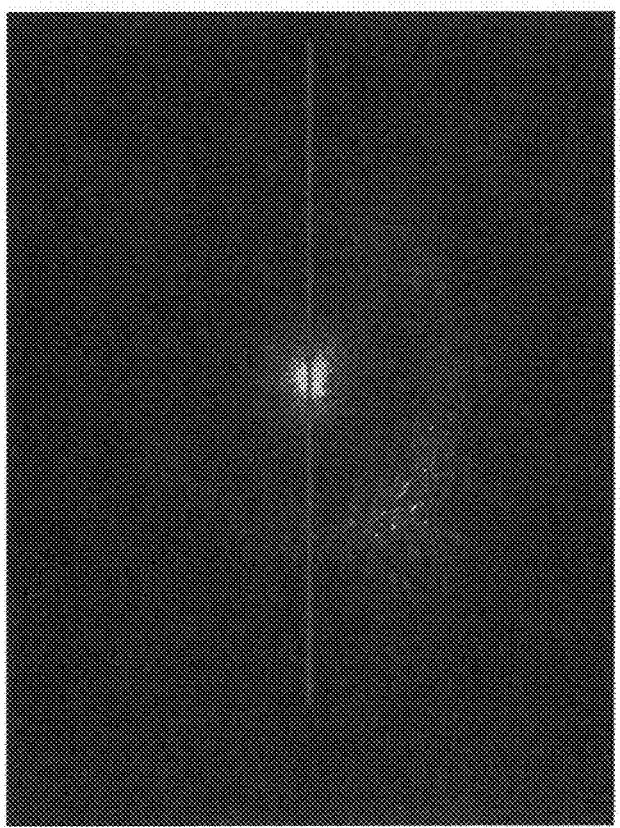
FIG. 19A is an image for showing an output change example III of the backscattered light detector in association with a change in focus position of the optical system of the gel particle measuring apparatus according to Example 2 with respect to the sample cell.
Figure 19B:
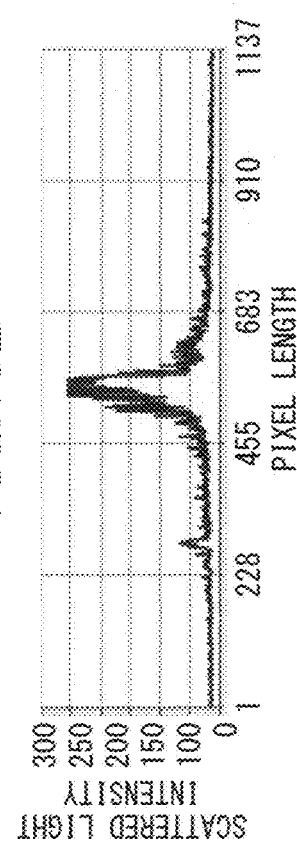
FIG. 19B is a graph for showing a distribution example of a scattered light intensity of FIG. 19A.

FIG. 19A is an image for showing an output example of the backscattered light detector 140 under a condition of g=1.0 mm and FIG. 19B is a graph for showing a scattered light intensity distribution thereof.

FIG. 19C is an image for showing an output example of the backscattered light detector 140 under a condition of g=1.5 mm, and FIG. 19D is a graph for showing a scattered light intensity distribution thereof.

Figure 20A:
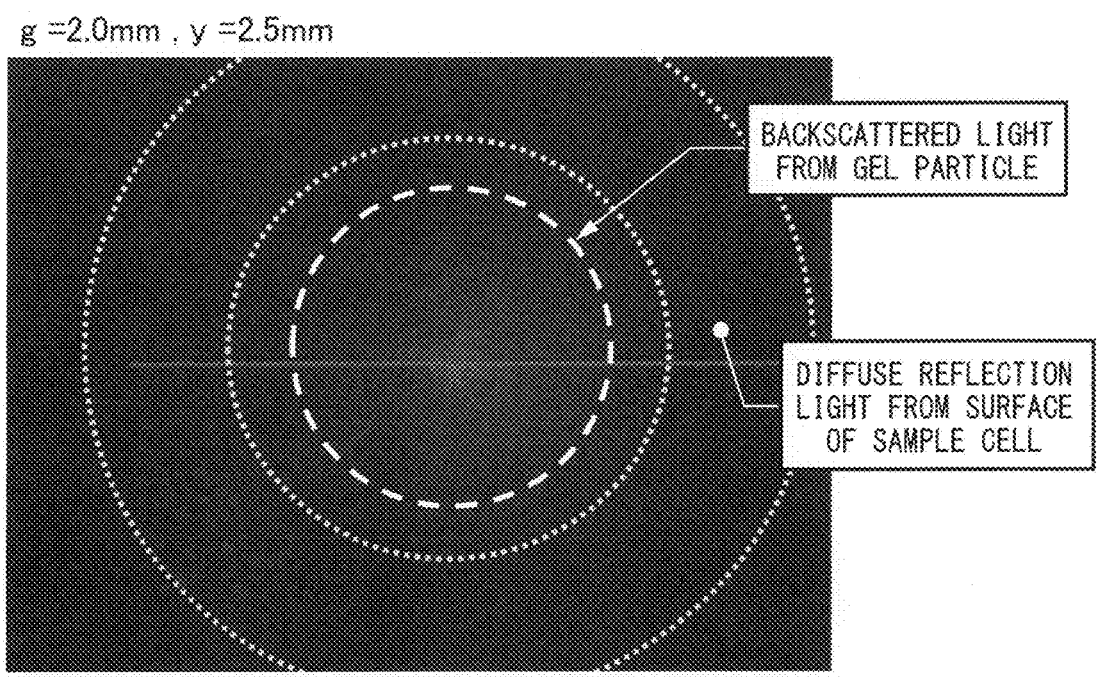
FIG. 20A is an image for showing an output change example V of the backscattered light detector in association with a change in focus position of the optical system of the gel particle measuring apparatus according to Example 2 with respect to the sample cell.
Figure 20B:
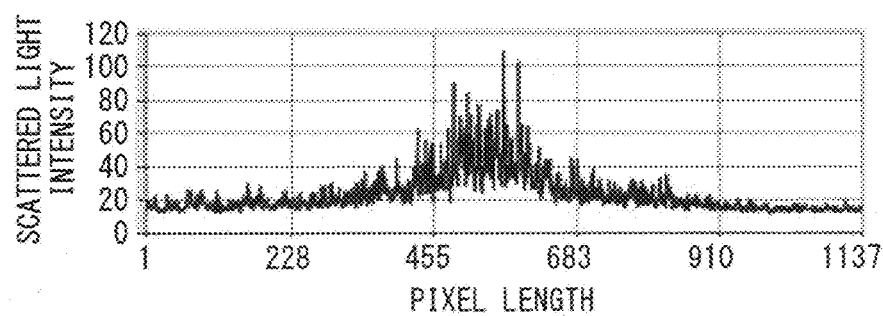
FIG. 20B is a graph for showing a distribution example of a scattered light intensity of FIG. 20A.

FIG. 20A is an image for showing an output example of the backscattered light detector 140 under a condition of g=2.0 mm, and FIG. 20B is a graph for showing a scattered light intensity distribution thereof.

As shown in FIG. 18A and FIG. 18B, when the incident focus position $Q_1$ of the imaging lens 135 corresponds to the surface of the sample cell 100, the output example of the backscattered light detector 140 is obtained as a wide detection signal having a strong scattered light intensity, and the scattered light contains the diffuse reflection light component from the surface of the sample cell 100 in addition to the backscattered light component from the gel particles. Thus, it is difficult to detect the backscattered light component separately from the diffuse reflection light component from the surface of the sample cell 100.

In addition, as shown in FIG. 18C and FIG. 18D, when g=0.5 mm (the incident focus position $Q_1$ of the imaging lens 135 falls within a peripheral wall of the sample cell 100), the output example of the backscattered light detector 140 is obtained as a detection signal diffused in a ring shape containing a strong scattered light component. In this case, the scattered light contains, for example, the diffuse reflection light component from the surface of the sample cell 100 in addition to the backscattered light component from the gel particles. Thus, it is difficult to separate the scattered light components from each other to detect only the backscattered light component from the gel particles.

In addition, as shown in FIG. 19A and FIG. 19B, when g=1.0 mm, the output example of the backscattered light detector 140 is obtained as a detection signal having an intensity distribution in which the backscattered light component from the gel particles is strong substantially at the center of the detection surface, and in a part of the periphery, the diffuse reflection light component from the surface of the sample cell 100 is observed as a detection signal having an extremely weak intensity under a state of being separated from the backscattered light component. In this case, it is understood that the incident focus position $Q_1$ of the imaging lens 135 is placed immediately after the peripheral wall of the sample cell 100, and hence the backscattered light component from the gel particles produced at the incident focus position $Q_1$ or in the vicinity thereof forms an image under a state of being focused on the detection surface of the backscattered light detector 140.

Accordingly, in this case, it can be said that the backscattered light component from the gel particles is accurately detected by the backscattered light detector 140.

In addition, as shown in FIG. 19C and FIG. 19D, when g=1.5 mm, the output example of the backscattered light detector 140 is obtained as a detection signal having an intensity distribution in which the backscattered light component from the gel particles is dispersed with a scattered light width larger than that in the case of g=1.0 mm substantially at the center of the detection surface, and in a part of the periphery, the diffuse reflection light component from the surface of the sample cell 100 is observed as a detection signal having an extremely weak intensity under a state of being separated from the backscattered light component. That is, in this case, the following is presumed. The incident focus position $Q_1$ of the imaging lens 135 is placed slightly away from a position immediately after the inner wall of the sample cell 100. Therefore, when the gel particles are produced immediately after the inner wall of the sample cell 100, the backscattered light component from the gel particles is detected under a state of being somewhat out of focus on the detection surface of the backscattered light detector 140.

Further, as shown in FIG. 20A and FIG. 20B, when g=2.0 mm, the output example of the backscattered light detector 140 is obtained as substantially the same detection signal as that in the case of g=1.5 mm, but is obtained as a detection signal having an intensity distribution in which the backscattered light component from the gel particles is dispersed with a scattered light width further larger than that in the case of g=1.5 mm.

As described above, in this Example, the following is understood. When the incident focus position $Q_1$ of the imaging lens 135 is placed on the surface or in the peripheral wall of the sample cell 100, the detection signal of the diffuse reflection light component is generated in the backscattered light detector 140, and hence it is difficult to detect the backscattered light component from the gel particles. However, when the incident focus position $Q_1$ of the imaging lens 135 has a distance of from 1.0 mm to 2.0 mm with respect to the surface of the sample cell 100, the backscattered light component from the gel particles can be detected under a state of being separated from the diffuse reflection light component from the surface of the sample cell 100.

INDUSTRIAL APPLICABILITY

The present invention is widely applied to a measuring apparatus for measuring a target substance capable of producing gel particles through a gelation reaction, as well as a gel particle measuring apparatus for measuring, for example, an endotoxin and a β-D-glucan through use of a *limulus* reagent.

The present invention can be applied to, for example, a blood coagulation reaction and an antigen-antibody reaction.

What is claimed is:

1. A gel particle measuring method for measuring a gel particle produced from a target substance in a sample through a gelation reaction, the method using:
   a sample cell, which has, in at least part thereof, an incident portion through which light enters, and includes a bottomed tubular container having a circular shape in cross section with at least the incident portion being penetrable, and accommodates the sample containing the target substance to be measured and a solution containing a reagent for causing gelation of the target substance;
   a stirrer continuously stirs a mixed solution including the sample and the reagent in the sample cell so as to inhibit gelation of the mixed solution as a whole;
   a light source, which is arranged outside the incident portion of the sample cell, and irradiates the mixed solution in the sample cell with coherent light; and
   a backscattered light detector, which is arranged outside the incident portion of the sample cell and on the same side as the light source, and detects, out of light scattered in the mixed solution in the sample cell, a backscattered light component returning toward the light source,
   the method comprising:
   a stirring step of continuously stirring the mixed solution with the stirrer under a state in which the mixed solution is accommodated in the sample cell;
   a light separating step of, during the stirring step, causing irradiation light from the light source to enter the mixed solution, making a reflection light path of light reflected from a surface of the sample cell different from a detection light path of which includes a part of an irradiation light path of the light radiated from the light source toward the sample cell, light traveling toward the backscattered light detector, and capturing the light component scattered in the mixed solution with the backscattered light detector; and
   a measuring step of measuring a fluctuation component of the scattered light based on a detection output of the backscattered light detector obtained through the light separating step, and determining a production state of the gel particle including at least a production start time point of the gel particle in the mixed solution leading to a time point at which the mixed solution changes in phase from a sol phase to a gel phase,
   wherein, in the light separating step, arranging an optical axis of the light source so that the optical axis passes through a position being offset from a center axis of the bottomed tubular container,
   wherein, in the light separating step, including a reflection surface that is formed in advance in the incident portion of the sample cell so that reflection light reflected from the incident portion surface, out of the irradiation light from the light source, travels toward a direction different from a direction toward the backscattered light detector, and
   wherein, in the light separating step, causing the irradiation light from the light source to be converged with a position immediately after the irradiation light has passed through the peripheral wall of the sample cell being an incident focus position.

2. A gel particle measuring apparatus for measuring a gel particle produced from a target substance in a sample through a gelation reaction, comprising:
   a sample cell, which has, in at least part thereof, an incident portion through which light enters, and includes a bottomed tubular container having a circular shape in cross section with at least the incident portion being penetrable, and accommodates the sample containing the target substance to be measured and a solution containing a reagent for causing gelation of the target substance;

a stirrer continuously stirs a mixed solution including the sample and the reagent in the sample cell so as to inhibit gelation of the mixed solution as a whole;

a light source, which is arranged outside the incident portion of the sample cell, and irradiates the mixed solution in the sample cell with coherent light during the stirring of the mixed solution with the stirrer;

a backscattered light detector, which is arranged outside the incident portion of the sample cell and on the same side as the light source, and detects, out of light scattered in the mixed solution in the sample cell, a backscattered light component returning toward the light source;

a light path adjuster, when irradiation light from the light source enters the incident portion of the sample cell, adjusts an incident portion surface of the sample cell so that a detection light path of which includes a part of an irradiation light path of the light radiated from the light source toward the sample cell, out of the light scattered in the mixed solution in the sample cell, light traveling toward the backscattered light detector is different from a reflection light path of light reflected from a surface of the sample cell; and a measurement device measures a fluctuation component of the scattered light based on a detection output of the backscattered light detector, and determines a production state of the gel particle including at least a production start time point of the gel particle in the mixed solution leading to a time point at which the mixed solution changes in phase from a sol phase to a gel phase, wherein the light path adjuster arranges an optical axis of the light source so that the optical axis passes through a position being offset from a center axis of the bottomed tubular container, wherein the light path adjuster includes a reflection surface that is formed in advance in the incident portion of the sample cell so that reflection light reflected from the incident portion surface, out of the irradiation light from the light source, travels toward a direction different from a direction toward the backscattered light detector, and wherein the light path adjuster causes the irradiation light from the light source to be converged with a position immediately after the irradiation light has passed through the peripheral wall of the sample cell being an incident focus position.

3. A gel particle measuring apparatus according to claim 2, wherein the light path adjuster includes a reflection surface that is formed in advance in the incident portion of the sample cell so that reflection light reflected from the incident portion surface, out of the irradiation light from the light source, travels toward a direction different from a direction toward the backscattered light detector.

4. A gel particle measuring apparatus according to claim 2, wherein an optical system of the gel particle measuring apparatus including the light source, the backscattered light detector, and the light path adjuster further includes a light path branching member which transmits the light radiated from the light source toward the incident portion of the sample cell, and branches the detection light path of, out of the light scattered in the mixed solution, the light traveling toward the backscattered light detector, from a middle of an irradiation light path from the light source.

5. A gel particle measuring apparatus according to claim 2, wherein an optical system of the gel particle measuring apparatus including the light source, the backscattered light detector, and the light path adjuster further includes: an imaging member for incidence causes the irradiation light from the light source to be converged with a proximity position after the irradiation light has passed through an inner wall of the sample cell being a focus position; and an imaging member for detection causes the light traveling toward the backscattered light detector to be converged with a detection surface of the backscattered light detector being a conjugate focus position.

6. A gel particle measuring apparatus according to claim 2, wherein an optical system of the gel particle measuring apparatus including the light source, the backscattered light detector, and the light path adjuster further includes: an imaging member for incidence causes the irradiation light from the light source to be converged with a proximity position after the irradiation light has passed through an inner wall of the sample cell being a focus position; a first imaging member for detection causes the light traveling toward the backscattered light detector to be converged with a position of a diaphragm member being a conjugate focus position, the diaphragm member being arranged in a middle of the detection light path toward the backscattered light detector; and a second imaging member for detection causes the light having passed through the diaphragm member to be converged with a detection surface of the backscattered light detector being a conjugate focus position.

7. A gel particle measuring apparatus according to claim 2, wherein an optical system of the gel particle measuring apparatus including the light source, the backscattered light detector, and the light path adjuster narrows down a light beam traveling from the light source toward the sample cell through a diaphragm member, and sets the light beam to be narrower than, out of the light scattered in the mixed solution, a light beam traveling toward the backscattered light detector.

8. A gel particle measuring apparatus according to claim 2, wherein the sample cell is arranged in a thermostatic chamber.

9. A gel particle measuring apparatus according to claim 2, wherein the sample cell includes, in the sample cell or around the sample cell, a stray light remover removes a stray light component generated by one of transmission and scattering on an inner wall of the sample cell other than, out of the irradiation light from the light source, a backscattered light component traveling toward the backscattered light detector in the mixed solution.

10. A gel particle measuring apparatus according to claim 2, further comprising a display displays measurement results of the measurement device.

11. A gel particle measuring apparatus according to claim 2, further comprising:

a first scattered light detector including the backscattered light detector detect detects, out of the light scattered in the mixed solution, the backscattered light component returning toward the light source; and a second scattered light detector detects, out of the light scattered in the mixed solution, a scattered light component other than the backscattered light component returning toward the light source, wherein the measurement device determines the production state of the gel particle including the production start time point of the gel particle in the mixed solution based on measurement results of the fluctuation component of the detection output of the first scattered light detector, and wherein the measurement device determines a production state of the gel particle, other than the production state of the gel particle including the production start time point of the gel particle in the mixed solution, based on measurement results of a fluctuation component of one of detection outputs of the first scattered light detector and the second scattered light detector and a detection output of the second scattered light detector.

12. A gel particle measuring apparatus according to claim 2, wherein the target substance to be measured comprises an endotoxin, and wherein the reagent for gelating the endotoxin comprises a reagent derived from one of a hemocyte of a *limulus* and a hemocyte of an organism equivalent to the *limulus*.

* * * * *